US009191428B2

(12) United States Patent
Hinohara et al.

(10) Patent No.: US 9,191,428 B2
(45) Date of Patent: *Nov. 17, 2015

(54) COMMUNICATION MANAGEMENT SYSTEM, COMMUNICATION SYSTEM, COMMUNICATION METHOD, AND RECORDING MEDIUM STORING COMMUNICATION CONTROL PROGRAM

(71) Applicant: RICOH COMPANY, LTD., Ohta-ku (JP)

(72) Inventors: Hiroshi Hinohara, Kanagawa (JP); Taro Okuyama, Tokyo (JP); Takahiro Asai, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 8 days.

This patent is subject to a terminal disclaimer.

(21) Appl. No.: 14/185,122

(22) Filed: Feb. 20, 2014

(65) Prior Publication Data

US 2014/0240449 A1    Aug. 28, 2014

(30) Foreign Application Priority Data

Feb. 28, 2013    (JP) .................................. 2013-039721

(51) Int. Cl.
| H04M 11/00 | (2006.01) |
| H04L 29/06 | (2006.01) |
| H04L 12/18 | (2006.01) |
| H04N 7/14 | (2006.01) |
| H04N 7/15 | (2006.01) |

(52) U.S. Cl.
CPC .......... *H04L 65/605* (2013.01); *H04L 12/1822* (2013.01); *H04N 7/148* (2013.01); *H04N 7/15* (2013.01)

(58) Field of Classification Search
CPC ...................................................... H04N 7/14
USPC .......... 348/14.01, 14.08, 14.09, 14.03, 14.11; 709/204
See application file for complete search history.

(56) References Cited

U.S. PATENT DOCUMENTS

2009/0112997 A1 *  4/2009  Parker et al. .................. 709/206
2013/0166718 A1 *  6/2013  Okuyama et al. ............. 709/223

FOREIGN PATENT DOCUMENTS

| JP | 4-343546 | 11/1992 |
| JP | 6-189052 | 7/1994 |
| JP | 2004-304241 | 10/2004 |
| JP | 2008-104116 | 5/2008 |
| JP | 2008-219893 | 9/2008 |
| JP | 2008-227577 | 9/2008 |

* cited by examiner

*Primary Examiner* — Olisa Anwah
(74) *Attorney, Agent, or Firm* — Oblon, McClelland, Maier & Neustadt, L.L.P.

(57) ABSTRACT

A communication management system receives identification information of a first communication terminal, obtains identification information of a candidate second communication terminal that is associated with the identification information of the first communication terminal, and obtains communications protocol information indicating a communications protocol of the candidate second communication terminal using a part of the identification information of the candidate second communication terminal. The communication management system determines whether the communications protocol is the same for the first communication terminal and the candidate second communication terminal, and transmits information based on the determination result.

12 Claims, 21 Drawing Sheets

FIG. 2
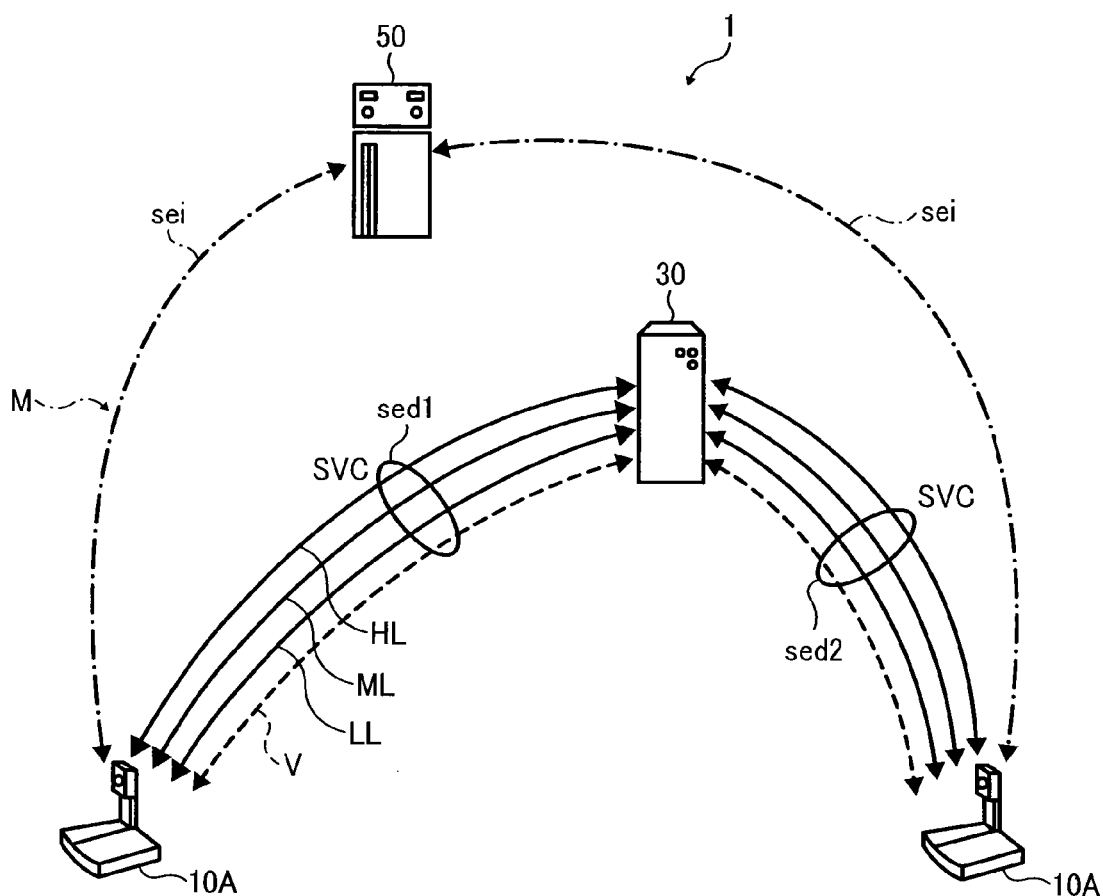
FIG. 3A  FITO G. 3B  FIG. 3C
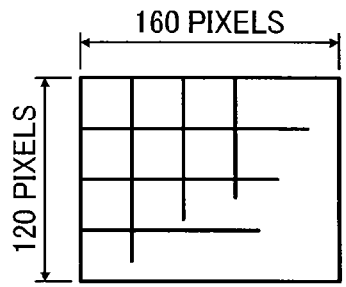
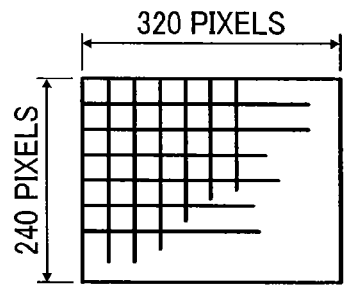
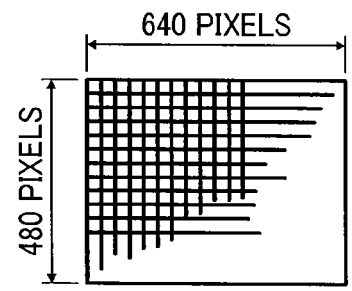

FIG. 10

VISUAL INFORMATION MANAGEMENT TABLE

| OPERATION STATE | VISUAL INFORMATION (ICON) |
|---|---|
| ONLINE (COMMUNICATION OK) | |
| ONLINE (COMMUNICATING) | |
| ONLINE (INTERRUPTED) | |
| OFFLINE | |
| UNKNOWN (DIFFERENT COMMUNICATION PROTOCOL) | |

FIG. 11

DATA QUALITY MANAGEMENT TABLE

| TERMINAL IP ADDRESS | IMAGE QUALITY |
|---|---|
| 1.3.1.4 | HIGH |
| 1.3.1.3 | HIGH |
| 1.2.2.3 | MEDIUM |
| ... | ... |

FIG. 12

RELAY DEVICE MANAGEMENT TABLE

| RELAY DEVICE ID | OPERATION STATE | DATE AND TIME RECEIVED | RELAY DEVICE IP ADDRESS | MAXIMUM DATA TRANSMISSION SPEED (Mbps) |
|---|---|---|---|---|
| 111a | ON LINE | 2011.11.10.13:00 | 1.2.1.2 | 100 |
| 111b | ON LINE | 2011.11.10.13:10 | 1.2.2.2 | 1000 |
| 111c | OFF LINE | 2011.11.10.13:20 | 1.3.1.2 | 10 |

FIG. 13

TERMINAL INFORMATION MANAGEMENT TABLE

| TERMINAL ID | PASSWORD | MODEL NUMBER | SERIAL NUMBER |
|---|---|---|---|
| 01aa | aaaa | 9001 | 2001 |
| 01ab | abab | 9001 | 2002 |
| 01ac | acac | 9001 | 2003 |
| ... | ... | ... | ... |
| 20da | dada | 8001 | 1001 |
| 30db | dbdb | 8001 | 1002 |
| 20dc | dcdc | 8001 | 1003 |
| ... | ... | ... | ... |

FIG. 14

TERMINAL STATE MANAGEMENT TABLE

| TERMINAL ID | TERMINAL NAME | OPERATION STATE | DATE AND TIME RECEIVED | TERMINAL IP ADDRESS |
|---|---|---|---|---|
| 01aa | JAPAN TOKYO OFFICE AA TERMINAL | ONLINE (COMMUNICATION OK) | 2011.11.10.13:40 | 1.2.1.3 |
| 01ab | JAPAN TOKYO OFFICE AB TERMINAL | ONLINE (INTERRUPT) | 2011.11.09.12:00 | 1.2.1.4 |
| ... | ... | ... | ... | ... |
| 01ba | JAPAN OSAKA OFFICE BA TERMINAL | OFFLINE | 2011.11.10.13:45 | 1.2.2.3 |
| 01bb | JAPAN OSAKA OFFICE BB TERMINAL | ONLINE (COMMUNICATION OK) | 2011.11.10.13:50 | 1.2.2.4 |
| ... | ... | ... | ... | ... |
| 01ca | U.S. NY OFFICE CA TERMINAL | ONLINE (COMMUNICATION OK) | 2011.11.10.12:45 | 1.3.1.3 |
| 01cb | U.S. NY OFFICE CB TERMINAL | ONLINE (COMMUNICATING) | 2011.11.10.13:55 | 1.3.1.4 |
| ... | ... | | | ... |
| 20da | U.S. WASH, D.C. OFFICE DA TERMINAL | | | |
| 30db | U.S. WASH, D.C. OFFICE DB TERMINAL | | | |
| ... | ... | | | |

FIG. 15

CANDIDATE LIST MANAGEMENT TABLE

| REQUEST TERMINAL ID | COUNTERPART TERMINAL ID |
|---|---|
| 01aa | 01ab,…,01ba,01bb,…,01ca,01cb,20da,30db |
| … | … |
| 01ba | 01aa,01ab,01ca,01cb,20da,30db |
| … | … |
| 01ca | 01aa,01ab,01ba,…,20da |
| … | … |
| 20da | 01aa,… |
| … | … |

FIG. 16

SESSION MANAGEMENT TABLE

| RELAY TERMINAL ID | REQUEST TERMINAL ID | COUNTERPART TERMINAL ID | DELAY TIME (ms) | DATE AND TIME RECEIVED |
|---|---|---|---|---|
| 111a | 01aa | 01ca | 200 | 2011.11.10.14:00 |
| 111b | 01ba | 01cb | 50 | 2011.11.10.14:10 |
| 111c | 01bb | 01cc | 400 | 2011.11.10.14:20 |
| … | … | … | … | … |

FIG. 17

CONVERSION MANAGEMENT TABLE

| NON-DEDICATED TERMINAL TERMINAL ID | CONVERSION SYSTEM IP ADDRESS | NON-DEDICATED TERMINAL IP ADDRESS |
|---|---|---|
| 20da | 1.3.2.2 | 1.3.2.3 |
| 30db | 1.3.2.2 | 1.3.2.4 |
| 20dc | 1.3.2.2 | 1.3.2.5 |
| ... | ... | ... |

FIG. 18

QUALITY MANAGEMENT TABLE

| DELAY TIME (ms) | IMAGE QUALITY |
|---|---|
| 0 - 100 | HIGH |
| 100 - 300 | MEDIUM |
| 300 - 500 | LOW |
| 500 - | (INTERRUPT) |

FIG. 19

COMMUNICATIONS PROTOCOL MANAGEMENT TABLE (1)

| TERMINAL ID PREFIX | COMMUNICATIONS PROTOCOL |
|---|---|
| 01 | DEDICATED |
| 20 | NON-DEDICATED 1 |
| 30 | NON-DEDICATED 2 |

FIG. 30A  FIG. 30B  FIG. 30C
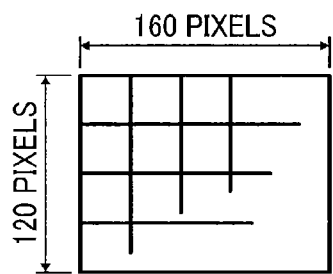
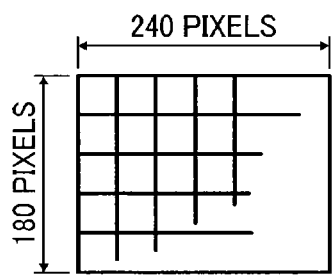
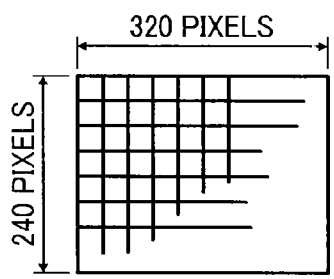
FIG. 31
COMMUNICATIONS PROTOCOL MANAGEMENT TABLE (2)
| MODEL NUMBER PREFIX | COMMUNICATIONS PROTOCOL |
|---|---|
| 90 | DEDICATED |
| 80 | NON-DEDICATED 1 |
| 70 | NON-DEDICATED 2 |

COMMUNICATION MANAGEMENT SYSTEM, COMMUNICATION SYSTEM, COMMUNICATION METHOD, AND RECORDING MEDIUM STORING COMMUNICATION CONTROL PROGRAM

CROSS-REFERENCE TO RELATED APPLICATIONS

This patent application is based on and claims priority pursuant to 35 U.S.C. §119 to Japanese Patent Application No. 2013-039721, filed on Feb. 28, 2013, in the Japan Patent Office, the entire disclosure of which is hereby incorporated by reference herein.

BACKGROUND

1. Technical Field

The present invention generally relates to managing communication between or among a plurality of communication terminals.

2. Background

The communication systems allow transmission of contents data such as image data and/or sound data among a plurality of communication terminals that are remotely located from one another through a relay device to facilitate communication among the plurality of communication terminals through a communications network such as the Internet. With the need for reducing costs or times associated with business trips, more companies are moving towards communication systems provided with the above-described telecommunication capabilities.

Further, a management system is provided on the communications network to notify the user at a request communication terminal of an operation state of a counterpart communication terminal, before the user starts communicating with the counterpart communication terminal. Since the user at one end is notified of whether the user at the other end is available for communication before starting communication, the user at one end is able to decide not to start communication when the operation state of the counterpart communication terminal at the other end indicates that the counterpart communication terminal is in the offline state or not available for communication.

SUMMARY

Example embodiments of the present invention include a communication management system, which manages communication to be established between a first communication terminal and a second communication terminal. The first communication terminal may be a request communication terminal that requests for information regarding a candidate second communication terminal, that is, a candidate counterpart communication terminal. The communication management system receives identification information of the first communication terminal. The communication management system obtains identification information of a candidate second communication terminal that is associated with the first communication terminal using the identification information of the first communication terminal, the candidate second communication terminal being one or more of a plurality of communication terminals. The communication management system further obtains communications protocol information indicating a communications protocol of the candidate second communication terminal using a part of the identification information of the candidate second communication terminal. The communication management system determines whether the communications protocol is the same for the first communication terminal and the candidate second communication terminal, and transmits information based on the determination result.

A communication system including the above-described communication management system, a method of managing communication performed by the communication management system, and a non-transitory recording medium storing a communication management program may be provided.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 2 is an illustration for explaining communication between or among a plurality of communication terminals using the same communications protocol;

FIGS. 3A to 3C are illustrations for explaining image quality of image data transmitted or received by the communication system of FIG. 1, according to the SVC standards;

FIG. 10 is an example data structure of a visual data management table, managed by the management system of FIG. 9;

FIG. 11 is an example data structure of an image quality management table, managed by the management system of FIG. 9;

FIG. 12 is an example data structure of a relay device management table, managed by the management system of FIG. 9;

FIG. 13 is an example data structure of a terminal management table, managed by the management system of FIG. 9;

FIG. 14 is an example data structure of a terminal state management table, managed by the management system of FIG. 9;

FIG. 15 is an example data structure of a candidate list management table, managed by the management system of FIG. 9;

FIG. 16 is an example data structure of a session management table, managed by the management system of FIG. 9;

FIG. 17 is an example data structure of a conversion management table, managed by the management system of FIG. 9;

FIG. 18 is an example data structure of a data quality management table, managed by the management system of FIG. 9;

FIG. 19 is an example data structure of a communications protocol management table, managed by the management system of FIG. 9;

FIGS. 30A to 30C are an illustration for explaining image quality of image data being converted by a conversion system of the communication system of FIG. 1; and FIG. 31 is an example data structure of a communications protocol management table, managed by the management system of FIG. 9.

Figure 1:
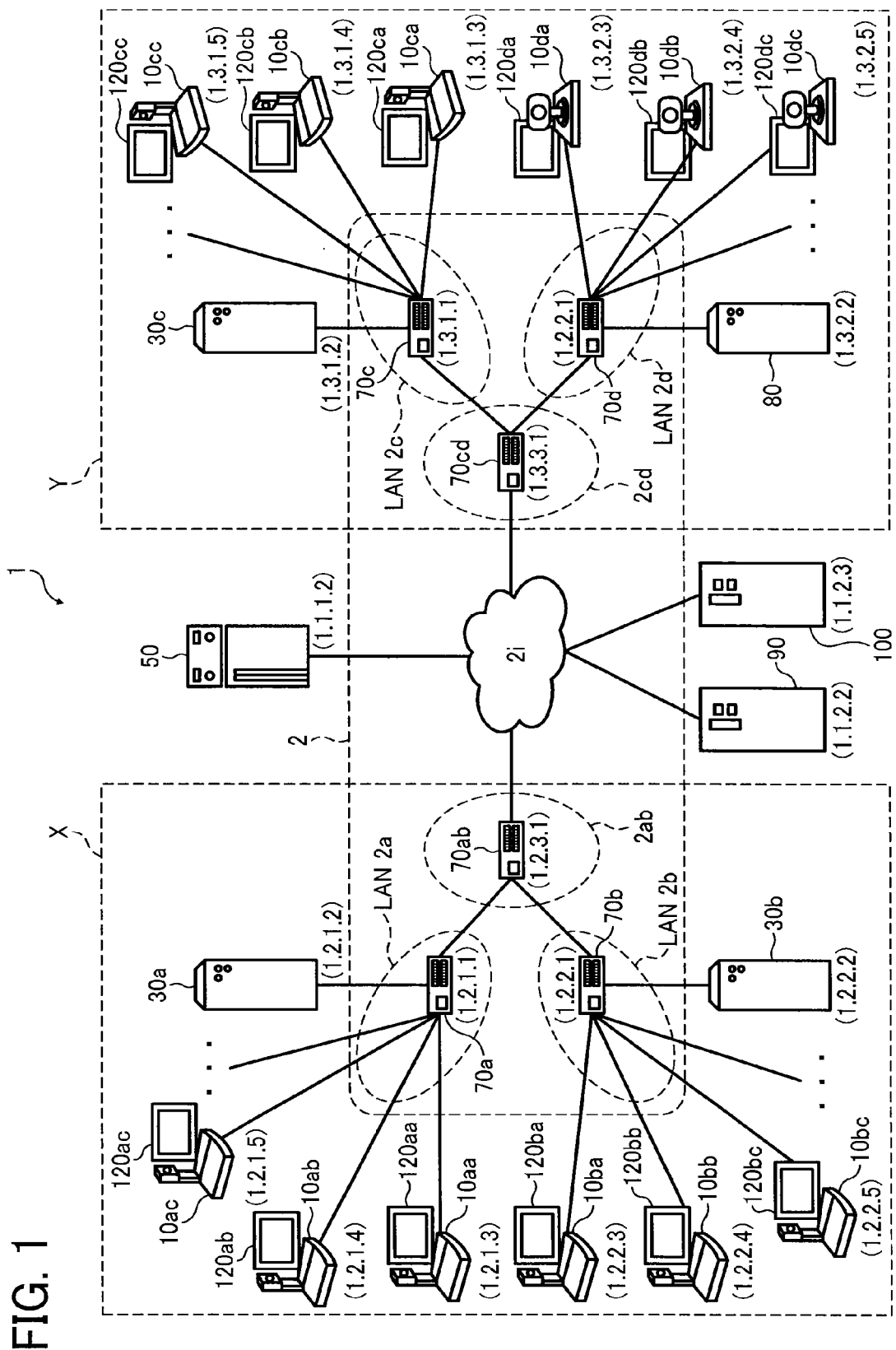
FIG. 1 is a schematic block diagram illustrating a communication system according to an example embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION OF EXAMPLE EMBODIMENTS

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

Referring now to FIGS. 1 to 30, an example embodiment of the present invention is explained.

<Configuration>

FIG. 1 illustrates a configuration of a communication system 1 according to an example embodiment of the present invention. The communication system 1 of FIG. 1 includes a plurality of communication terminals 10aa, 10ab, 10ac, 10ba, 10bb, 10bc, 10ca, 10cb, 10cc, 10da, 10db, and 10dc, and a plurality of displays 120aa, 120ab, 120ac, 120ba, 120bb, 120bc, 120ca, 120cb, 120cc, 120da, 120db, and 120dc, a plurality of relay devices 30a, 30b, and 30c, a communication management system 50, a conversion system 80, a program providing system 90, and a maintenance system 100. In the following examples, the communication system 1 is implemented as a videoconference system that allows at least two of the plurality of communication terminals 10 to remotely communicate with one another. More specifically, the communication system 1 allows transmission of contents data, such as image data and sound data, between or among at least two of the plurality of communication terminals 10. The communication system 1 further includes a plurality of routers 70a, 70b, 70c, 70d, 70ab, and 70cd, which may be collectively or each referred to as the router 70. The router 70 selects a route that is most suitable for transmitting contents data such as image data and sound data.

Still referring to FIG. 1, the terminals 10aa, 10ab, and 10ac, the relay device 30a, and the router 70a are connected to a local area network (LAN) 2a. The terminals 10ba, 10bb, and 10bc, the relay device 30b, and the router 70b are connected to a LAN 2b. The LAN 2a and the LAN 2b are connected to a leased line 2ab in which the router 70ab is provided. It is assumed that the LAN 2a, LAN 2b, and the leased line 2ab, are located in an area X. For example, assuming that the area X is any area in Japan, the LAN 2a could be located within an office in a city such as Tokyo, and the LAN 2b could be located within an office in another city such as Osaka.

The terminals 10ca, 10cb, and 10cc, the relay device 30c, and the router 70c are connected to a LAN 2c. The terminals 10da, 10db, and 10dc, the relay device 30d, and the router 70d are connected to a LAN 2d. The LAN 2c and the LAN 2d are connected to a leased line 2cd in which the router 70cd is provided. It is assumed that the LAN 2c, LAN2d, and leased line 2cd are located in an area Y apart from the area X. For example, assuming that the area is any area in the United States, the LAN 2c could be located within an office in a city such as New York, and the LAN 2d could be located within an office in another city such as Washington, D.C. The area X and the area Y are connected through the Internet 2i, via the routers 70ab and 70cd.

For the descriptive purposes, in this example, any number of the plurality of communication terminals 10aa to 10dc may be collectively or each referred to as the terminal 10. Any number of the plurality of displays 120aa to 120dc may be collectively or each referred to as the display 120. Any number of the plurality of relay devices 30a, 30b, and 30c may be collectively or each referred to as the relay device 30. The communication management system 50 may be referred to as the "management system" 50.

The terminal 10 that transmits data to another terminal 10 to carry out videoconference is referred to as the request terminal 10. The terminal 10 that receives data from another terminal 10 to carry out videoconference is referred to as the counterpart terminal 10. For example, the request terminal 10 includes any terminal 10 that requests another terminal 10 to start videoconference, and the counterpart terminal 10 includes any terminal 10 that is requested by the request terminal 10 to start videoconference.

The management system 50, the program providing system 90, and the maintenance system 100 are connected through the Internet 2i to the terminal 10 and the relay device 30. In this example, the conversion system 80 is connected to the router 70d on the LAN 2d, located in the area Y. Any one of the management system 50, the program providing system 90, and the maintenance system 100 may be located at any location within or outside any one of the area X and the area Y.

In this example, the communications network 2 includes the LAN 2a, LAN 2b, leased line 2ab, Internet 2i, leased line 2cd, LAN 2c, and LAN 2d. Any one or any portion of these lines or any other lines that may be included in the communications network 2 may be implemented as wired network or wireless network such as Wireless Fidelity (WiFi) network or Bluetooth network.

As shown in FIG. 1, the terminal 10, the relay device 30, the management system 50, the router 70, the conversion system 80, the program providing system 90, and the maintenance system 100 are each provided with four digit numbers. These four digit numbers separated by dots are the simple expressions of IP addresses respectively assigned to any one of the devices shown in FIG. 1, each of which has a function of communication device. For example, the IP address of the terminal 10aa is "1.2.1.3". For simplicity, it is assumed that the IP address is expressed in IPv4. Alternatively, the IP address may be expressed in IPv6.

Further, in this example, the terminal 10 may be communicated in various ways. For example, at least two different terminals 10 that are located at different rooms in the same office, or at least two different terminals 10 that are located at different offices that are remotely located from one another, may communicate with one another. In another example, at least two different terminals 10 that are located in the same room may communicate with one another. In another example, one terminal 10 that is located indoor and another terminal 10 that is located outdoor, or at least two different terminals 10 that are both located outdoor, may communicate with one another. When the terminal 10 is located outdoor, the terminal 10 communicates with the other terminal 10 through a wireless network such as a wireless network designed for a mobile phone.

The communication terminal 10 of FIG. 1 allows a user to communicate with another user at the counterpart communication terminal 10, by transmitting or receiving contents data such as image data and sound data. For example, any terminal that may be used for videoconference may be used. Further, the terminal 10 transmits or receives contents data to or from the counterpart terminal 10 using a predetermined communications protocol. The communications protocol used by the terminal 10 is mainly defined by a call control protocol used for connecting or disconnecting connections with the counterpart terminal, and an encoding format used for encoding the contents data to an IP packet.

Examples of the call control protocol being used by the terminal 10 include, but not limited to, (1) session initial protocol (SIP), (2) H.323, (3) the extended SIP, (4) Instant Messenger (IM) Protocol such as extensible messaging and presence protocol (XMPP), ICQ (Registered Trademark), AIM (Registered Trademark), or Skype (Registered Trademark), (5) protocol using the SIP message method, (6) Internet relay chat (IRC) protocol, and (7) extended IM based protocol such as Jingle.

Further, in this example, any one of the communication terminal 10 that communicates data using a predetermined communications protocol, is referred to as a dedicated terminal 10A. In one example, the dedicated terminal 10A uses the (4) IM protocol or the (7) extended IM based protocol as a call control protocol, and the Scalable Video Coding (SVC) as an encoding format. The SVC is the Annex G extension of the AGC.

Further, any one of the communication terminal 10 that communicates data using a communications protocol other than the predetermined communications protocol of the dedicated terminal 10A, is referred to as a non-dedicated terminal 10D. In this example, when the communication terminal 10 uses a call control protocol other than the (4) IM protocol or the (7) extended IM based protocol, and/or an encoding format other than the SVC, it is determined that the communication terminal 10 is the non-dedicated terminal 10D.

In one example, whether the terminal 10 is the dedicated terminal 10A or the non-dedicated terminal 10D may depend on a specific organization that manufactures, sells, or manages the terminal 10, as the communications protocol may be determined based on a communications network or system in use by the specific organization. The dedicated terminal 10A is defined as a communication terminal that is manufactured, sold, or managed by a specific organization such as a specific company. The non-dedicated terminal 10D is defined as a communication terminal that is manufactured, sold, or managed by an organization other than the specific organization.

In another example, whether the terminal 10 is the dedicated terminal 10A or the non-dedicated terminal 10D may depend on time when the terminal 10 is manufactured, or time when the terminal 10 is sold such as when it is released to the market. The dedicated terminal 10A may be defined as a communication terminal that is manufactured or sold by a specific organization, after the time when the non-dedicated terminal 10D is manufactured or sold by the specific organization. For example, even though the dedicated terminal 10A and the non-dedicated terminal 10D are both manufactured, sold, or managed by the same organization, the dedicated terminal 10A may be a new model such that it communicates using a different communications protocol than the communications protocol of the non-dedicated terminal 10D.

The relay device 30 is a computer system, which may be implemented by one or more computers, to relay contents data between or among the terminals 10. The management system 50 is a computer system, which may be implemented by one or more computers, to centrally manage various information such as login information of the terminal 10, the communication state of the terminal 10, candidate list information, and the communication state of the relay device 30. In this example, a moving image, a still image, or both of the still image and the moving image, may be transmitted as the image data.

The conversion system 80 functions as a signaling gateway that converts a call control signal as well as a video/audio gateway that encodes the contents data. More specifically, the conversion system 80 converts a communications protocol of the contents data that is transmitted from one terminal 10, to a communications protocol compatible with the other counterpart terminal 10. The conversion system 80 at least converts a call control protocol or an encoding format of the contents data so that the contents data is compatible with the terminal 10 to which the contents data is sent.

The program providing system 90 is a computer system, which may be implemented by one or more computers, to provide programs to the terminal 10, the relay device 30, the management system 50, the conversion system 80, and the maintenance system 100, respectively, through the communications network 2.

The maintenance system 100 is a computer system, which may be implemented by one or more computers, to maintain, manage, fix, or upgrade at least one of the terminal 10, relay device 30, management system 50, conversion system 80, and program providing system 90. Assuming that the maintenance system 100 is provided within a country, and the terminal 10, relay device 30, management system 50, conversion system 80, and program providing system 90 are each installed outside the country, the maintenance system 100 maintains, manages, fixes, or upgrades at least one of the terminal 10, relay device 30, management system 50, conversion system 80, and program providing system 90, remotely through the communications network 2. The maintenance system 100 may manage maintenance of at least one of the terminal 10, relay device 30, management system 50, conversion system 80, and program providing system 90 without using the communications network 2. For example, a machine type number, a manufacturing number, customer information, maintenance and repair information, and failure log information may be maintained at the maintenance system 100 without using the communications network 2.

Referring now to FIGS. 2 and 3A to 3C, a first communications pattern in which contents data are transmitted between two dedicated terminals 10A is explained according to an example embodiment of the present invention. FIG. 2 illustrates a communication state in which the communication terminals 10 communicate with each other using the same communications protocol.

As illustrated in FIG. 2, in the first communications pattern, the communication terminals 10 in the communication system 1 communicate with each other in compliance with the H.264/SVC video coding standards. More specifically, in the communication system 1, the request terminal 10 and the counterpart terminal 10 each of which is implemented as the dedicated terminal 10A establish a management data communication session "sei" through the management system 50 to transmit or receive various management data "M". The request terminal 10 and the counterpart terminal 10 further establish four contents data communication sessions including a session "HL" to transmit high-level resolution image data, a session "ML" to transmit medium-level resolution image data, a session "LL" to transmit low-level resolution image data, and a session "V" to transmit sound data, through the relay device 30.

Referring to FIG. 2, the above-described four contents data communication sessions established between the request terminal 10 and the relay device 30 to transmit contents data are collectively referred to as a first communication session "sed1". The above-described four contents data communication sessions established between the counterpart terminal 10 and the relay device 30 to transmit contents data are collectively referred to as a second communication session "sed2".

Referring now to FIGS. 3A to 3C, resolution of image data to be transmitted or received according to the first communications pattern of FIG. 2, in compliance with the SVC standards, is explained in more detail.

As illustrated in FIG. 3A, the low-level resolution image data, which functions as a base image, has 160 pixels in the horizontal direction and 120 pixels in the vertical direction. Referring to FIG. 3B, the medium-level resolution image data has 320 pixels in the horizontal direction and 240 pixels in the vertical direction. Referring to FIG. 3C, the high-level resolution image data has 640 pixels in the horizontal direction and 480 pixels in the vertical direction. In case of communicating with a narrowband signal line, low-quality image data that is generated based on the low-level resolution image data, which is the base image, is transmitted. In case of communicating with a wideband signal line, medium-quality image data that is generated based on the low-level resolution image data and the medium-level resolution image data is transmitted. In case of communicating with a broadband signal line, high-quality image data that is generated based on the low-level resolution image data, the medium-level resolution image data, and the high-level resolution image data is transmitted. Any one of the above-described types of image data may be transmitted together with sound data such as voice data.

Figure 4:
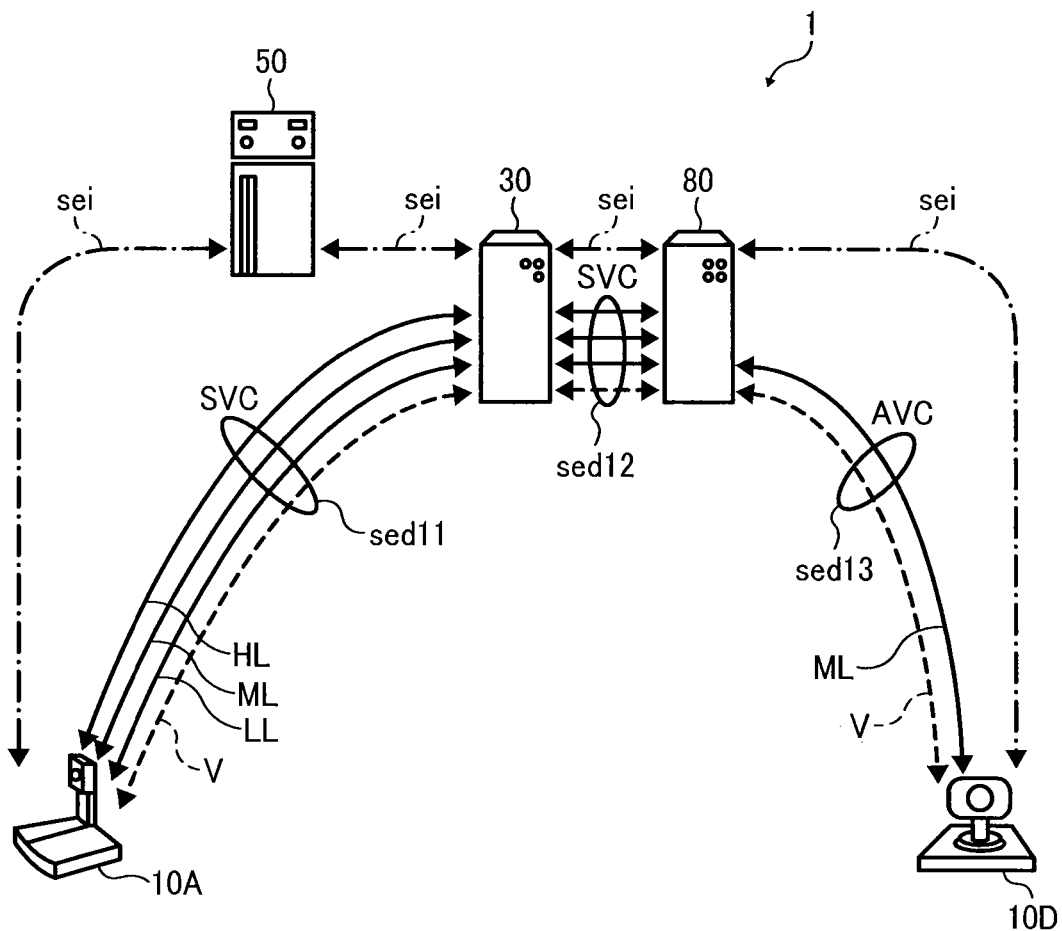
FIG. 4 is an illustration for explaining communication between or among a plurality of communication terminals using different communications protocols.
Figure 5:
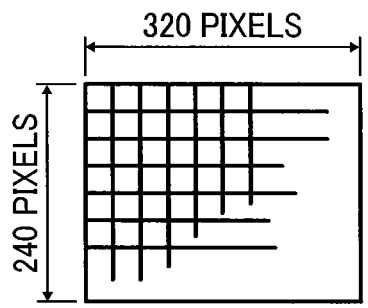
FIG. 5 is an illustration for explaining image quality of image data transmitted or received by the communication system of FIG. 1, according to the AVC standards.

Referring now to FIGS. 4 and 5, a second communications pattern in which contents data are transmitted between the dedicated terminal 10A and the non-dedicated terminal 10D is explained according to an example embodiment of the present invention. FIG. 4 illustrates a communication state in which the communication terminals 10 communicate with each other using different communications protocols.

As illustrated in FIG. 4, in the second communications pattern, one communication terminal 10 in the communication system 1 communicates in compliance with the H.264/SVC video coding standards, and the other communication terminal 10 in the communication system 1 communicates in compliance with the H.264/advanced video coding (AVC) video coding standards. More specifically, in the communication system 1, the request terminal 10 that is implemented as the dedicated terminal 10A, and the counterpart terminal 10 that is implemented as the non-dedicated terminal 10D, establish a management data communication session "sei" through the management system 50 to transmit or receive various management data "M". More specifically, in this example, the management data communication session "sei" is established between the dedicated terminal 10A and the non-dedicated terminal 10D through the management system 50, via the relay device 30 and the conversion system 80.

The request terminal 10A and the conversion system 80 establish four contents data communication sessions including a session "HL" to transmit high-level resolution image data, a session "ML" to transmit medium-level resolution image data, a session "LL" to transmit low-level resolution image data, and a session "V" to transmit sound data, through the relay device 30, based on the H.264/SVC standards. In FIG. 4, the above-described four contents data communication sessions established between the request terminal 10A and the relay device 30 to transmit contents data are collectively referred to as a first communication session "sed11". The above-described four contents data communication sessions established between the conversion system 80 and the relay device 30 to transmit contents data are collectively referred to as a second communication session "sed12".

The conversion system 80 and the counterpart terminal 10D establish two contents data communication sessions including a session "ML" to transmit medium-level resolution image data, and a session "V" to transmit sound data, through the relay device 30, based on the H.264/AVC standards. In FIG. 4, the above-described two contents data communication sessions established between the conversion system 80 and the counterpart terminal 10D to transmit contents data are collectively referred to as a third communication session "sed13".

Referring now to FIGS. 3A to 3C and 5, resolution of image data to be transmitted or received according to the second communications pattern of FIG. 4, in compliance with the AVC standards, is explained in more detail.

In the first communication session "sed11" and the second communication session "sed12" of FIG. 4, the low-level resolution image data of FIG. 3A, the medium-level resolution image data of FIG. 3B, and the high-level resolution image data of FIG. 3C may be transmitted or received, as described above referring to the example case of FIG. 2. In the third communication session "sed13" of FIG. 4, the medium-level resolution image data of FIG. 5 is transmitted or received. The medium-level resolution image data of FIG. 5 is substantially similar to the medium-level resolution image data of FIG. 3B. Any one of the above-described types of image data may be transmitted together with sound data such as voice data.

<Hardware Structure of Communication System>

Figure 6:
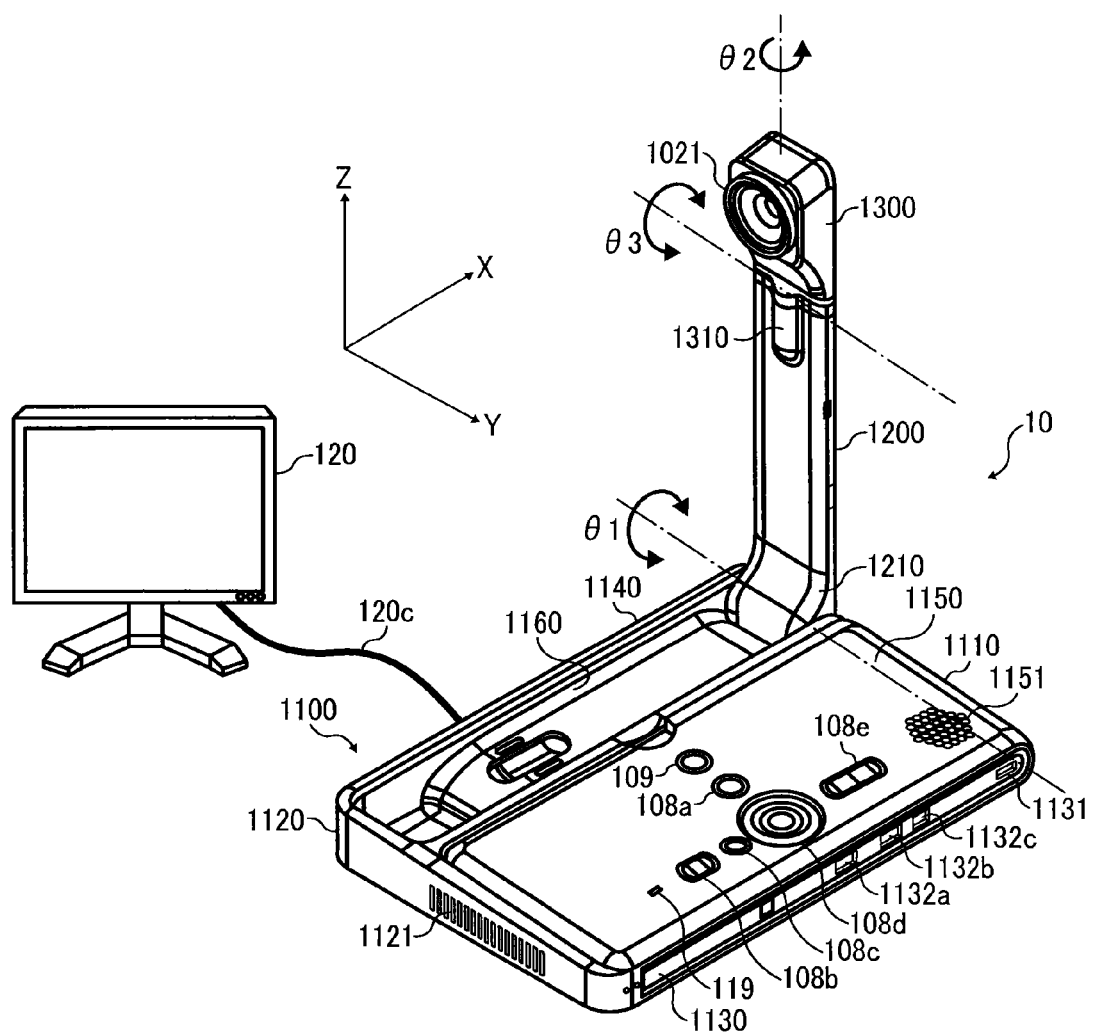
FIG. 6 is a perspective view illustrating the outer appearance of a communication terminal of the communication system of FIG. 1.

FIG. 6 is a perspective view illustrating the outer appearance of the communication terminal 10 of the communication system 1 of FIG. 1. As illustrated in FIG. 6, the terminal 10 includes a body 1100, an arm 1200, and a camera housing 1300. The body 1100 includes a front side wall 1110 having a plurality of air intake holes that are formed over the nearly entire surface of the intake surface of the back side wall 1110. The body 1100 further includes a back side wall 1120 provided with an exhaust surface 1121 having a plurality of exhaust holes over the nearly entire surface of the exhaust surface 1121. When a cooling fan that is provided within the body 1100 is driven, air flows in through the intake holes of the intake surface and out through the exhaust holes of the exhaust surface 1121. The body 1100 further includes a right side wall 1130 formed with a sound pickup hole 1131. Through the sound pickup hole 1131, a microphone 114 (FIG. 7) of the terminal 10 is able to catch sounds such as human voice or any sound including noise.

Figure 7:
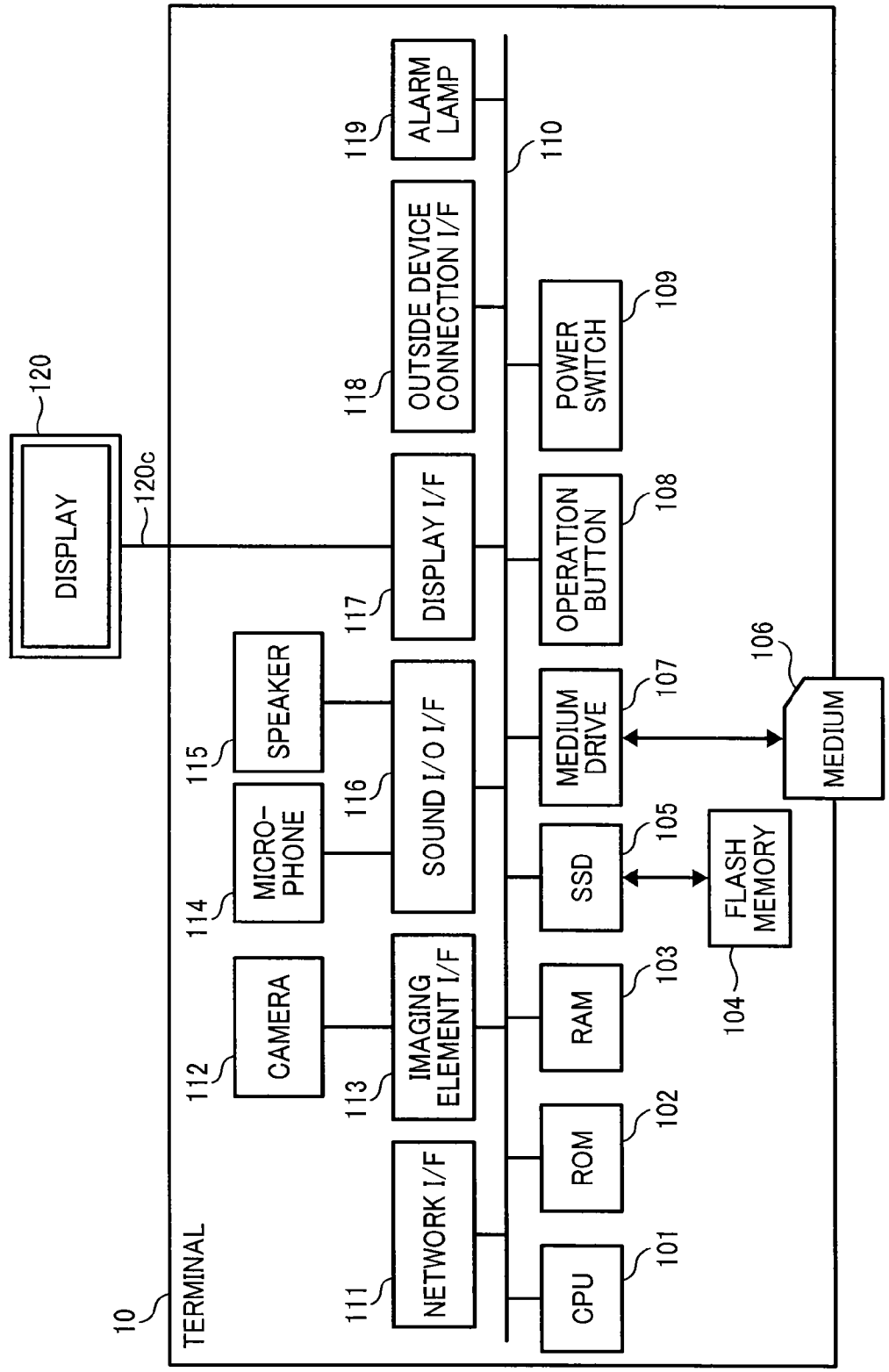
FIG. 7 is a schematic block diagram illustrating a hardware structure of the communication terminal of FIG. 6.

The body 1100 has an operation panel 1150, which is provided at a front surface toward the right side wall 1130. The operation panel 1150 includes a plurality of operation keys 108a to 108e ("the operation key 108"), a power switch 109, an alarm lamp 119, and a plurality of sound output holes 1151. Through the sound output holes 1151, a speaker 115 (FIG. 7) of the terminal 10 is able to output sounds such as sounds generated based on human voice. The body 1100 further includes a holder 1160, which is provided at the front surface toward the left side wall 1140. The holder 1160, which has a concave shape, accommodates therein the arm 1200 and the camera housing 1300. The right side wall 1130 is further provided with a plurality of connection ports 1132a to 1132c ("connection ports 1132"). The connection ports 1132 allow electrical connection to an external device through an outside device connection I/F 118 (FIG. 7). The body 1100 further includes a left side wall 1140, which is provided with a connection port to connect the external display 120 to the display I/F 117 through a cable 120c.

The arm 1200 is fixed to the body 1100 via a torque hinge 1210. With the torque hinge 1210, the arm 1200 can be rotated in directions of up and down with respect to the body, while making a tilt angle θ1 of up to 135 degrees. FIG. 6 illustrates the case where the tilt angle θ1 is 90 degrees.

The camera housing 1300 incorporates therein the camera 112 (FIG. 7) that takes an image of an object. The object may be a part of a user, document, or a room where the terminal 10 is located. The camera housing 1300 is provided with a torque hinge 1310. The camera housing 1300 is fixed to the arm 1200 through the torque hinge 1310. With the torque hinge 1310, the camera housing 1300 can be rotated with respect to the arm 1200, in the direction of up, down, right, and left, such that the camera housing 1300 is kept at a desired position. More specifically, the camera housing 1300 can be rotated, while making a pan angle θ2 from about −180 degrees to 180 degrees in the direction right and left, and a tilt angle θ3 that ranges from about −45 degrees to +45 degrees in the direction of up and down. In FIG. 6, the pan angle θ2 and the tilt angle θ3 are each 0 degree.

The relay device 30, the management system 50, the conversion system 80, the program providing system 90, and the maintenance system 100 are each implemented by any desired number of general-purpose computers such as a personal computer or a server computer. For simplicity, explanation of the outer appearance of the computer is omitted.

FIG. 7 is a schematic block diagram illustrating a hardware structure of the communication terminal 10. As illustrated in FIG. 7, the terminal 10 includes a central processing unit (CPU) 101, a read only memory (ROM) 102, a random access memory (RAM) 103, a flash memory 104, a solid state drive (SSD) 105, a medium drive 107, the operation key 108, the power switch 109, a network interface (I/F) 111, the camera 112, an imaging element interface (I/F) 113, the microphone 114, the speaker 115, a sound input/output interface (I/O I/F) 116, the display interface (I/F) 117, the outside device connection interface (I/F) 118, and an alarm lamp 119, which are electrically connected through a bus 110 such as an address bus or data bus. The CPU 101 controls entire operation of the terminal 10. The ROM 102 stores therein a control program for execution by the CPU 101, such as an initial program loader (IPL). The RAM 103 functions as a work area of the CPU 101. The flash memory 104 stores therein various data such as the terminal control program, image data, or sound data such as voice data. The SSD 105 controls reading or writing of various data with respect to the flash memory 104 under control of the CPU 101. The medium drive 107 controls reading or writing of various data with respect to a removable recording medium 106 such as a flash memory. The operation key 108 allows the user to input a user instruction, for example, by allowing the user to select a communication destination such as the counterpart terminal 10. The power switch 109 allows the user to switch on or off the power of the terminal 10. The network I/F 111 allows the terminal 10 to transmit data through the communications network 2.

The camera 112 takes an image of an object to obtain image data under control of the CPU 101. The imaging element I/F 113 controls operation of the camera 112. The microphone 114 catches sounds such as voice of the user at the terminal 10. The speaker 115 outputs sounds such as sounds generated based on voice of the user at the counterpart terminal 10. The sound I/O I/F 116 controls input or output of sound signals such as voice signals with respect to the microphone 114 and the speaker 115 under control of the CPU 101. The display I/F 117 transmits image data to the display 120 under control of the CPU 101. The outside device connection I/F 118 controls connection of the terminal 10 to various types of outside device. The alarm lamp 119 generates notification when an error is detected in the terminal 10.

The display 120 may be implemented by a liquid crystal display (LCD) or an organic light emitting display, which displays various data such as an image of an object or an operation icon. As illustrated in FIGS. 6 and 7, the display 120 is connected to the display I/F 117 through the cable 120c. The cable 120c may be implemented by an analog RCB (VGA) signal cable, a component video cable, a high-definition multimedia interface (HDMI) signal cable, or a digital video interactive (DVI) signal cable.

The camera 112 includes a plurality of devices such as a lens system, and a solid-state image sensing device that photo-electrically converts a light to generate an image of an object. For example, the solid-state image sensing device includes a complementary metal oxide semiconductor (CMOS) or a charge coupled device (CCD).

The outside device connection I/F 118 may be connected to an outside device such as an external camera, external microphone, or external speaker through a universal serial bus (USB) cable that is connected through the port 1132 of the body 1100 (FIG. 6). When the external camera is connected to the terminal 10, the CPU 101 causes the terminal 10 to capture an image using the external camera, rather than the camera 112 that is incorporated in the terminal 10. When the external microphone or the external speaker is connected to the terminal 10, the CPU 101 causes the terminal 10 to use the external microphone or the external speaker in replace of the incorporated microphone 114 or the incorporated speaker 115.

The recording medium 106, which can be freely attached to or detached from the terminal 10, includes any desired type of recording medium. In alternative to the flash memory 104, any nonvolatile memory that is readable and writable under control of the CPU 101 may be used such as Electrically Erasable and Programmable ROM (EEPROM).

The terminal control program may be written onto a recording medium that is readable by a general-purpose computer such as the recording medium 106 in any format that is installable or executable by a general-purpose computer. Once the terminal control program is written onto the recording medium, the recording medium may be distributed. Further, the terminal control program may be stored in any desired memory other than the flash memory 104, such as the ROM 102.

Figure 8:
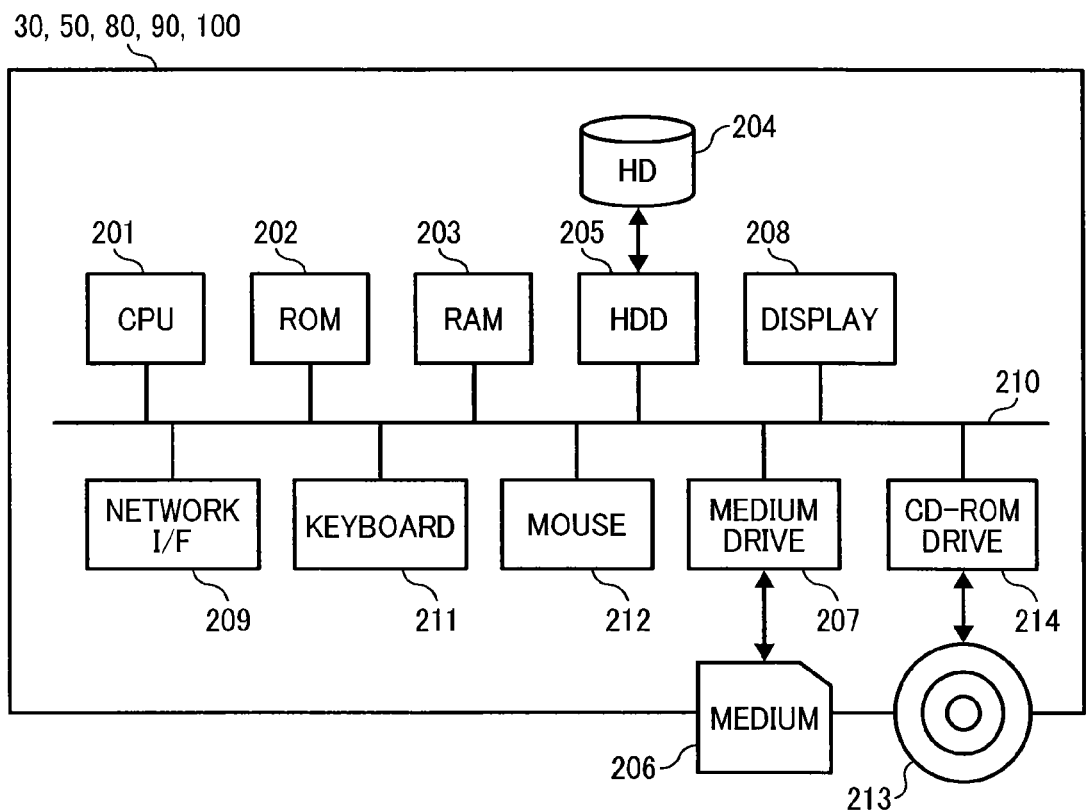
FIG. 8 is a schematic block diagram illustrating a hardware structure of any one of the communication management system, relay device, exchange system, program providing system, and maintenance system of the communication system of FIG. 1.

FIG. 8 illustrates a hardware structure of the management system 50 of FIG. 1. The management system 50 includes a CPU 201, a ROM 202, a RAM 203, the HD 204, a hard disk drive (HDD) 205, a medium drive 207, a display 208, a network interface (I/F) 209, a keyboard 211, a mouse 212, and a CD-ROM drive 214, which are electrically connected through a bus 210 such as an address bus or a data bus.

The CPU 201 controls entire operation of the management system 50. The ROM 202 stores a control program for execution by the CPU 201, such as an IPL. The RAM 203 functions as a work area of the CPU 201. The HD 204 stores therein various data such as the transmission management program. The HDD 205 controls reading or writing of various data with respect to the HD 204 under control of the CPU 201. The medium drive 207 controls reading or writing of various data with respect to a removable recording medium 206 such as a flash memory. The display 208 displays various data such as a cursor, menu, window, character, or image. The network I/F 209 allows the management system 50 to transmit data through the communications network 2. The keyboard 211 includes a plurality of keys, each of which is used for inputting a user instruction through a character, a numeral, or a symbol. The mouse 212 allows the user to input a user instruction including, for example, selection or execution of a specific instruction, selection of an area to be processed, and instruction of cursor movement. The CD-ROM drive 214 controls reading or writing of various data with respect to a CD-ROM 213. In alternative to the CD-ROM 213, any removable recording medium may be used.

The communication management program may be written onto a recording medium that is readable by a general-purpose computer such as the recording medium 206 or the CD-ROM 213 in any format that is installable or executable by a general-purpose computer. Once the communication management program is written onto the recording medium, the recording medium may be distributed. Further, the communication management program may be stored in any desired memory other than the HD 204, such as the ROM 202.

The relay device 30 is substantially similar in hardware structure to the management system 50 of FIG. 8, except for replacement of the management program with a relay device control program that is used for controlling the relay device 30. The relay device control program may be written onto a recording medium that is readable by a general-purpose computer such as the recording medium 206 or the CD-ROM 213 in any format that is installable or executable by the general-purpose computer. Once the relay device control program is written onto the recording medium, the recording medium may be distributed. Further, the relay device control program may be stored in any desired memory other than the HD 204, such as the ROM 202.

The conversion system 80 is substantially similar in hardware structure to the management system 50 of FIG. 8, except for replacement of the management program with a conversion control program that is used for controlling the conversion system 80. The conversion control program may be written onto a recording medium that is readable by a general-purpose computer such as the recording medium 206 or the CD-ROM 213 in any format that is installable or executable by the general-purpose computer. Once the conversion control program is written onto the recording medium, the recording medium may be distributed. Further, the conversion control program may be stored in any desired memory other than the HD 204, such as the ROM 202.

The program providing system 90 is substantially similar in hardware structure to the management system 50 of FIG. 8, except for replacement of the management program with a program providing program that is used for controlling the program providing system 90. The program providing program may be written onto a recording medium that is readable by a general-purpose computer such as the recording medium 206 or the CD-ROM 213 in any format that is installable or executable by the general-purpose computer. Once the program providing program is written onto the recording medium, the recording medium may be distributed. Further, the program providing program may be stored in any desired memory other than the HD 204, such as the ROM 202.

The maintenance system 100 is substantially similar in hardware structure to the management system 50 of FIG. 8, except for replacement of the management program with a maintenance program that is used for controlling the maintenance system 100. The maintenance program may be written onto a recording medium that is readable by a general-purpose computer such as the recording medium 206 or the CD-ROM 213 in any format that is installable or executable by the general-purpose computer. Once the maintenance program is written onto the recording medium, the recording medium may be distributed. Further, the maintenance program may be stored in any desired memory other than the HD 204, such as the ROM 202.

Other examples of removable recording medium, which may be used in replace of the CD-ROM 213, include, but not limited to, compact disc recordable (CD-R), digital versatile disk (DVD), and blue ray disc.

<Functional Structure of Communication System>

Figure 9:
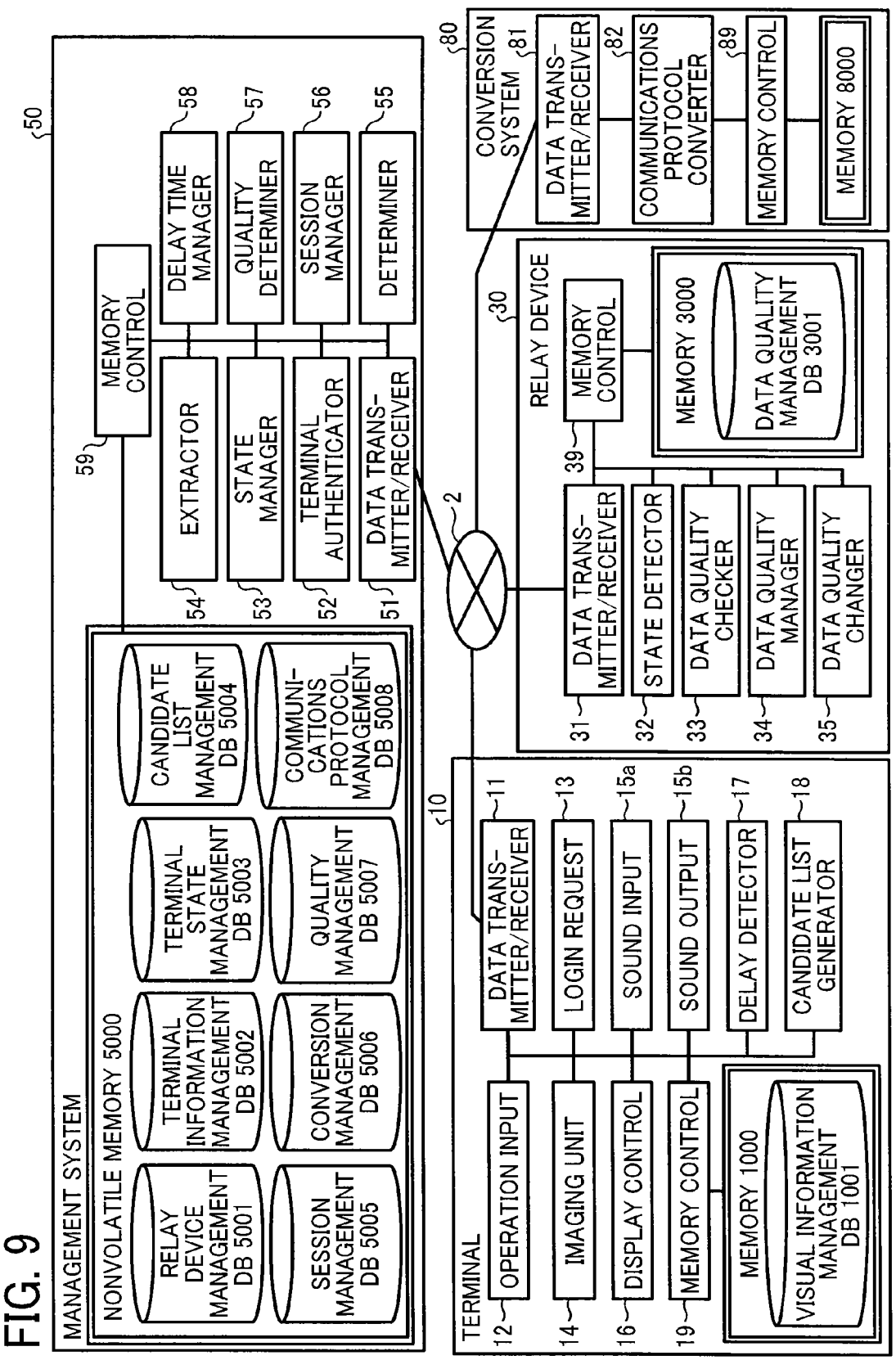
FIG. 9 is a schematic block diagram illustrating a functional structure of the communication terminal, relay device, communication management system, and conversion system of the communication system of FIG. 1.

Next, a functional structure of the communication system of FIG. 1 is explained according to an example embodiment of the present invention. FIG. 9 is a schematic block diagram illustrating functional structure of the communication system 1. As illustrated in FIG. 9, the terminal 10, the relay device 30, the management system 50, and the conversion system 80 exchange data with one another through the communications network 2. In FIG. 9, the program providing system 90 and the maintenance system 100 of FIG. 1 are omitted.

<Functional Structure of Terminal>

The terminal 10 includes a data transmitter/receiver 11, an operation input 12, a login request 13, an imaging unit 14, a sound input 15a, a sound output 15b, a display control 16, a delay detector 17, a candidate list generator 18, and a memory control 19. These units shown in FIG. 9 correspond to a plurality of functions or functional modules, which are executed according to an instruction of the CPU 101 (FIG. 7) that is generated according to the terminal control program being loaded from the flash memory 104 onto the RAM 103. The terminal 10 further includes a memory 1000 that may be implemented by the flash memory 104 and the RAM 103 of FIG. 7.

(Visual Information Management Table)

FIG. 10 illustrates an example data structure of a visual information management table. The memory 1000 includes a visual information management database (DB) 1001, which stores the visual information management table of FIG. 10. The visual information management table of FIG. 10 stores, for each one of operation state information indicating an operation state of the counterpart terminal, visual information to be displayed on the display 120 in the form of candidate list. In this example, the visual information is expressed as an icon representing a specific operation state of the terminal as illustrated in FIG. 10. The terminal 10 may obtain visual information to be stored in the visual information management table of FIG. 10 from the management system 50, for example, as a response in response to the login request information transmitted from the terminal 10 (S22 of FIG. 20). Alternatively, the visual information may be previously stored in the memory 1000, before the terminal 10 is shipped to the user's site.

In this example, the visual information is mainly classified into first visual information that visually indicates that a communications protocol used by the counterpart terminal is the same as a communications protocol used by the request terminal, and second visual information that visually indicates that a communications protocol used by the counterpart terminal is different from a communications protocol used by the request terminal. The first visual information and the second visual information are respectively designed such that the user can easily notice the difference in appearance when they are displayed. Further, in this example, the first visual information mainly includes first visual information indicating that the operation state of the counterpart terminal is online and available for communication ("online, communication OK"), first visual information indicating that the operation state of the counterpart terminal is online and communicating ("online, communicating"), first visual information indicating that the operation state of the counterpart terminal is online but interrupted ("online, interrupted"), and first visual information indicating that the operation state of the counterpart terminal is offline ("offline"). The second visual information indicates that the operation state of the counterpart terminal is not known ("unknown"), as the management system 50 is not able to obtain the operation state information from the counterpart terminal that is determined to be the non-dedicated terminal 10D. In other words, the second visual information indicates that the counterpart terminal, which is determined to be the non-dedicated terminal 10D, communicates using a communications protocol different from the communications protocol of the dedicated terminal 10A ("different communication protocol").

Referring now to FIGS. 7 and 9, a functional structure of the terminal 10 is explained according to an example embodiment of the present invention. More specifically, in this example, the operations or functions that are performed by the terminal 10, which include the operations or functions performed by the units shown in FIG. 9, are performed in cooperation with one or more hardware devices of the terminal 10 that are shown in FIG. 7.

The data transmitter/receiver 11, which may be implemented by the network I/F 111 (FIG. 7) under control of the CPU 101, transmits or receives various data or information to or from another terminal, device, or system, through the communications network 2. In this example, the data transmitter/receiver 11 starts receiving the operation state information that indicates the operation state of each candidate counterpart terminal 10 from the management system 50, before starting communication with any counterpart terminal 10. The operation state of the candidate terminal 10 indicates whether the candidate terminal 10 is online or offline. When the terminal 10 is online, the operation state of the candidate terminal 10 further indicates whether the candidate terminal 10 is available for communication ("communication OK"), the candidate terminal 10 is having communication with the other terminal ("communicating"), the candidate terminal 10 is not available as the user leaves the seat, or the candidate terminal 10 is having communication but interrupted ("communication, interrupted). The operation state of the candidate terminal 10 may further indicate whether the candidate terminal 10 is online but in trouble or error ("online, communicating, trouble"), the candidate terminal 10 is online but not capable of outputting image data such that only sound data is output, or the candidate terminal 10 is online but in mute state ("online, mute") such that sound data is not output. For example, when the cable 120c is disconnected from the terminal 10, the operation state of the candidate terminal 10 is assumed to be in the trouble state. For the descriptive purposes, in the following examples, it is assumed that the operation state information indicates whether the candidate terminal 10 is online or offline, and if online, whether the candidate terminal 10 is available for communication, for example, as described above referring to FIG. 10.

The operation input 12 receives a user instruction input by the user through the operation key 108 or the power switch 109 (FIG. 7), under control of the instructions received from the CPU 101. For example, when the user selects "ON" using the power switch 109, the operation input 12 receives a user instruction for turning the power on, and causes the terminal 10 to turn on the power.

The operations or functions of the login request 13 are performed according to an instruction received from the CPU 101 (FIG. 7). When the power of the terminal 10 is turned on, the login request 13 automatically causes the data transmitter/receiver 11 to send login request information that requests the login process, and a current IP address of the terminal 10, to the management system 50 through the communications network 2. When the power of the terminal 10 is turned off according to a user instruction received from the user through the power switch 109, the login request 13 causes the data transmitter/receiver 11 to send current operation state information of the terminal 10 to the management system 50, which indicates that the power of the terminal 10 is turned off.

After the operation state information is sent, the operation input 12 turns off the power of the terminal 10. As the operation state information of the terminal 10 is sent every time the power is turned off, the management system 50 is able to know that the terminal 10 is offline in realtime. The operations or functions of the imaging unit 14 of the terminal 10 are performed by the camera 112 and the imaging element I/F 113 according to an instruction received from the CPU 101 (FIG. 7). The imaging unit 14 takes an image of an object to output image data of the object.

The operations or functions of the sound input 15a of the terminal 10 are performed by the sound I/O I/F 116 according to an instruction received from the CPU 101, in cooperation with the microphone 114. After the microphone 114 converts sounds of the user at the terminal 10 to a sound signal, the sound input 15a inputs the sound signal in the form of sound data for further processing. The operations or functions of the sound output 15b of the terminal 10 are performed by the sound I/O I/F 116 according to an instruction received from the CPU 101, in cooperation with the speaker 115. The sound output 15b outputs a sound signal of sound data that is received from the counterpart terminal 10 through the speaker 115.

The operations or functions of the display control 16 of the terminal 10 of FIG. 9 are performed by the display I/F 117 according to an instruction received from the CPU 101 (FIG. 7). The display control 16 controls transmit of image data, which is generated based on image data of different resolutions, to the display 120. The display control 16 further causes the display 120 that is provided for the request terminal 10 to display a candidate list before the request terminal 10 starts videoconference with a desired counterpart terminal 10. The display control 16 may search the visual information management table (FIG. 10) using the operation state information received from the management system 50 as a search key to extract visual information that corresponds to the operation state specified by the operation state information, and causes the display 120 to display an image based on the extracted visual information as a candidate list.

The delay detector 17 detects a delay time ms indicating a time period in which contents data such as image data or sound data sent through the relay device 30 from another terminal 10 is delayed, according to an instruction received from the CPU 101 (FIG. 7).

The candidate list generator 18, which may be implemented by the instructions received from the CPU 101 (FIG. 7), generates a candidate list that reflects the operation state of the candidate counterpart terminal 10 based on the candidate list information and the terminal state information that are respectively stored in the memory 1000. As described below, the candidate list generator 18 searches the visual information management table (FIG. 10) based on the terminal state information to extract visual information that is associated with the terminal state information. The candidate list generator 18 displays an image reflecting the extracted visual information within the candidate list frame for the terminal ID and the terminal name of each candidate terminal.

The memory control 19 is implemented by the SSD 105 of FIG. 7 according to an instruction received from the CPU 101. The memory control 19 stores various data in the memory 1000, or reads out various data from the memory 1000. The memory 1000 stores therein various data such as terminal identification (ID) information for identifying the terminal 10, and a password for authenticating a user at the terminal 10. The memory 1000 further stores therein image data and/or sound data that is received as the terminal 10 communicates with a counterpart terminal 10 such that the image data and/or sound data are overwritten. Before the image data is overwritten, an image generated based on the image data is displayed onto the display 120. Before the sound data is output, sounds generated based on the sound data is output through the speaker 150.

In this example, any one of the terminal ID of the terminal 10 and the relay device ID of the relay device 30 includes any type of identification information that can be expressed by any language, character, symbol, mark, or any combination of language, character, symbol, and mark.

<Functional Structure of Relay Device>

Now, a functional structure of the relay device 30 is explained. The relay device 30 includes a data transmitter/receiver 31, a state detector 32, a data quality checker 33, a data quality manager 34, a data quality changer 35, and a memory control 39. These units shown in FIG. 9 correspond to a plurality of functions or functional modules, which are executed according to an instruction of the CPU 201 (FIG. 8) that is generated according to the relay device control program being loaded from the HD 204 onto the RAM 203. The relay device 30 further includes a memory 3000 that may be implemented by the RAM 203 and/or the HD 204 (FIG. 8).

(Data Quality Management Table)

The memory 3000 includes a data quality management database (DB) 3001, which stores a data quality management table illustrated in FIG. 11. The data quality management table of FIG. 11 stores an Internet protocol (IP) address of the counterpart terminal 10 to which image data is transmitted through the relay device 30, in association with quality of image data to be transmitted through the relay device 30 to the counterpart terminal 10.

(Functional Structure of Relay Device)

Next, a functional structure of the relay device 30 is explained according to an example embodiment of the present invention. More specifically, in this example, the operations or functions that are performed by the relay device 30, which include the operations or functions performed by the units shown in FIG. 9, are performed in cooperation with one or more hardware devices of the relay device 30 that are shown in FIG. 8.

The data transmitter/receiver 31, which may be implemented by the network I/F 209 (FIG. 8), transmits or receives various data or information to or from another terminal, device, or system, through the communications network 2, under control of instructions received from the CPU 201. Further, the data transmitter/receiver 31 initializes a communication session for the relay device 30.

More specifically, the data transmitter/receiver 31 transmits session start request information, which instructs to start a communication session (the first communication session), to the terminal 10 having the IP address that is received at the data transmitter/receiver 31. The data transmitter/receiver 31 transmits session start request information, which instructs to start a communication session (the second communication session), to the conversion system 80 having the IP address that is received at the data transmitter/receiver 31. The data transmitter/receiver 31 further transmits the IP address of the counterpart terminal 10 to the conversion system 80.

The state detector 32, which is implemented by the CPU 201 of FIG. 8, detects an operation state of the relay device 30. For example, the operation state includes the online state ("online"), the offline state ("offline"), the communicating state ("communicating"), and the interrupted state ("interrupted"). The online state is a state in which the relay terminal 30 is turned on and available for data transmission/reception.

The offline state is a state in which the relay terminal 30 is not available for data transmission/reception, for example, as the power is not turned on.

The data quality checker 33, which is implemented by the CPU 201 of FIG. 8, searches the data quality management DB 3001 (FIG. 11) using the IP address of the counterpart terminal 10 as a search key to extract information regarding the quality of image data suitable to communication with the counterpart terminal 10. Based on the extracted information regarding the quality of image data, the relay device 30 determines the quality of image data to be transmitted to the counterpart terminal 10.

The data quality manager 34, which may be implemented by the CPU 201 of FIG. 8, changes the contents of the data quality management DB 3001 based on the quality information that is received from the management system 50. For example, assuming that the request terminal 10aa having the terminal ID "01aa" communicates with the counterpart terminal 10ba having the terminal ID "01ba" to transmit or receive high quality image data during videoconference, transmission of image data may delay for various reasons. For example, if a request terminal 10bb and a counterpart terminal 10ca start videoconference over the communications network 2, transmission of image data from the request terminal 10aa to the counterpart terminal 10ba tends to slow down due to the increase in traffic. In such case, the relay device 30 changes the quality of image data to be transmitted from high image quality to lower image quality. More specifically, the contents in the data quality management DB 3001 is changed from high-level image quality to medium-level image quality, based on the quality information indicating the use of medium-level image quality.

The data quality changer 35, which may be implemented by the CPU 201 of FIG. 8, changes the quality of image data received from the request terminal 10 to the quality of image data according to the contents of the data quality management DB 3001.

The memory control 39 is implemented by the HDD 205 of FIG. 8 according to an instruction received from the CPU 201. The memory control 39 stores various data in the memory 3000, or reads out various data from the memory 3000.

<Functional Structure of Management System>

The management system 50 includes a data transmitter/receiver 51, a terminal authenticator 52, a state manager 53, an extractor 54, a determiner 55, a session manager 56, a quality determiner 57, a delay time manager 58, and a memory control 59. These units shown in FIG. 9 correspond to a plurality of functions or functional modules, which are executed according to an instruction of the CPU 201 (FIG. 8) that is generated according to the transmission management program being loaded from the HD 204 onto the RAM 203. The management system 50 further includes a memory 5000, which may be implemented by the HD 204 (FIG. 8). The memory 500 stores various databases, and candidate list frame data.

(Relay Device Management Table)

The memory 5000 includes a relay device management database (DB) 5001, which stores therein a relay device management table of FIG. 12. The relay device management table of FIG. 12 stores, for each relay device ID of the relay device 30, the operation state of the relay device 30, the received date and time at which the management system 50 receives the operation state information indicating the operation state of the relay device 30 from the relay device 30, the IP address of the relay device 30, and the maximum data transmission speed of the relay device 30 in Mbps. For example, for the relay device 30a having the relay terminal ID "111a", the relay device management table of FIG. 12 indicates that the operation state is "ON LINE", the received date and time at which the management system 50 receives the operation state information is "13:00 PM of Nov. 10, 2011", the IP address of the relay device 30a is "1.2.1.2", and the maximum data transmission speed of the relay terminal 30a is 100 Mbps.

(Terminal Information Management Table)

The memory 5000 further includes a terminal information management database (DB) 5002, which stores a terminal information management table of FIG. 13. The terminal information management table of FIG. 13 stores a plurality of terminal IDs respectively assigned to the terminals 10 that are managed by the management system 50, in association with a plurality of passwords that are previously determined for the respective terminals 10. The terminal information management table of FIG. 13 further stores a model number of the terminal 10, and a serial number of the terminal 10, for each one of the terminals 10. For example, referring to the terminal information management table of FIG. 13, the terminal 10aa having the terminal ID "01aa" is assigned with the password "aaaa", and has the model number "9001", and the serial number "2001".

(Terminal State Management Table)

The memory 5000 further includes a terminal state management database (DB) 5003, which stores a terminal state management table of FIG. 14. The terminal state management table of FIG. 14 stores, for each one of the terminal IDs assigned to the terminals 10, the terminal name to be used for communication with the terminal 10, the terminal name of the terminal 10, the operation state of the terminal 10, the received date and time at which the management system 50 receives the login request information from the terminal 10, and the IP address of the terminal 10. For example, for the terminal 10aa having the terminal ID "01aa", the terminal state management table of FIG. 14 indicates that the terminal name is "Japan Tokyo Office AA terminal", the operation state is online ("ONLINE") and is available for communication ("COMMUNICATION OK"), the received date and time is "13:40 PM, Nov. 10, 2011", and the IP address of the terminal 10aa is "1.2.1.3".

In this example, the terminal state management table of FIG. 14 only manages information regarding the dedicated terminals 10A such that information regarding any terminal other than the dedicated terminals 10A, such as the IP addresses of the non-dedicated terminals 10D, are not managed using the terminal state management table of FIG. 14.

(Candidate List Management Table)

The memory 5000 further includes a candidate list management database (DB) 5004, which stores a candidate list management table of FIG. 15. The candidate list management table of FIG. 15 stores, for each one of a plurality of request terminals 10 capable of requesting for videoconference communication, the terminal ID of the request terminal 10, and one or more terminal IDs that are respectively assigned to candidate terminals 10 that are previously registered for the request terminal 10. In this example, for the request terminal 10, one or more terminals 10 of the communication system 1 of FIG. 1 are previously registered as the candidate terminal 10. For example, the candidate list management table of FIG. 15 indicates that the request terminal 10aa having the terminal ID "01aa" is most likely to request for videoconference with respect to the terminal 10ab having the terminal ID "01ab", the terminal 10ba having the terminal ID "01ba", and the terminal 10bb having the terminal ID "01bb", etc. The management system 50 manages the candidate list management table of FIG. 15, for example, according to a user instruction received from any one of the terminals 10. For example, in response to a user instruction received from the terminal 10aa, the management system 50 may add or delete the contents of the candidate list management table of FIG. 15.

As described above, the terminal state management table of FIG. 14 does not store information such as the IP address regarding the terminal 10 other than the dedicated terminal 10A. The candidate list management table of FIG. 15 stores information such as the terminal ID regarding the terminal 10 other than the dedicated terminal 10A. More specifically, the candidate list management table of FIG. 15 stores information regarding the candidate counterpart terminal 10 irrespective of whether the terminal 10 is the dedicated terminal 10A or the non-dedicated terminal 10D.

(Session Management Table)

The memory 5000 further includes a session management database (DB) 5005, which stores a session management table of FIG. 16. The session management table of FIG. 16 stores information regarding each of the sessions that are carried out by at least two terminals 10 of the communication system 1 for the purpose of selecting the relay device 30 that is most suitable for communication between at least two terminals 10. More specifically, for each session, the session management table of FIG. 16 stores a relay device ID of the relay device 30 to be used for transmitting or receiving contents data such as image data and sound data, a terminal ID of the request terminal 10, a terminal ID of the counterpart terminal 10, a delay time ms indicating a time period required for receiving contents data at the counterpart terminal 10, and the date and time information indicating the time at which the management system 50 receives delay information from the counterpart terminal 10.

For example, referring to the session management table of FIG. 16, the relay device 30a having the relay device ID "111a" is selected to relay image data and sound data between the request terminal 10aa having the terminal ID "01aa" and the counterpart terminal 10ca having the terminal ID "01ca". Further, the management system 50 receives the delay information from the counterpart terminal 10ca at 14:00 PM, Nov. 10, 2011. Based on the delay information, the delay time ms of 200 milliseconds (ms) is obtained. In case of having videoconference between only two terminals 10, the time at which the delay time is received may be determined based on the time when the management system 50 receives the delay information transmitted from the request terminal 10 rather than based on the time when the management system 50 receives the delay information transmitted from the counterpart terminal 10. In case of having videoconference with more than two terminals 10, the delay information transmitted from the counterpart terminal 10 that receives the image data and sound data is used to manage the date and time at which the delay information is received.

(Conversion Management Table)

The memory 5000 further includes a conversion management database (DB) 5006, which stores a conversion management table of FIG. 17. The conversion management table of FIG. 17 stores, for each one of a plurality of terminal IDs each assigned to the non-dedicated terminal 10, the IP address of the conversion system 80, and the IP address of the non-dedicated terminal 10.

(Quality Management Table)

The memory 5000 further includes a quality management database (DB) 5007, which stores a quality management table of FIG. 18. The quality management table of FIG. 18 stores the delay time ms of image data in association with the quality of image data. More specifically, the quality management table of FIG. 18 indicates that the quality of image data to be processed by the relay device 30 is lowered, as the delay time ms of the image data at the request terminal 10 or the counterpart terminal 10 increases. For example, when the delay time ms is equal to or greater than 0 milliseconds (ms), but less than 100 ms, the image data quality is high. When the delay time ms is equal to or greater than 100 ms but less than 300 ms, the image data quality is medium. When the delay time ms is equal to or greater than 300 but less than 500 ms, the image data quality is low. When the delay time ms is equal to or greater than 500 ms, the management system 50 interrupts operation of transmitting data.

(Communications Protocol Management Table)

The memory 5000 further includes a communications protocol management database (DB) 5008, which stores a communications protocol management table of FIG. 19. The communications protocol management table of FIG. 19 stores a part of terminal ID, and information (communications protocol information) indicating a communications protocol of the terminal 10 identified by the whole terminal ID, in association with each other. In this example, the terminal ID prefix "01", "20", and "30" is previously determined to be used as the part of the terminal ID.

The communications protocol "dedicated" indicates that the terminal 10 uses the communications protocol used by the dedicated terminal 10A as described above referring to FIGS. 2 and 4. The communications protocol "non-dedicated 1" indicates that the terminal 10 uses the communications protocol used by the non-dedicated terminal 10D as described above referring to FIG. 4. The communications protocol "non-dedicated 2" indicates that the terminal 10 uses a communications protocol, which differs from the communications protocol used by the dedicated terminal 10A and the communications protocol used by the non-dedicated terminal 10D. In other words, the non-dedicated terminal 10D may not only be limited to one type of communication terminal 10.

As long as a part of the terminal ID is used to distinguish between or among the terminals 10 communicating in different communications protocols, any part of the terminal ID may be used other than the prefix. For example, the terminal ID usually has a part common to all terminals that are manufactured, sold, or managed by the same organization. Accordingly, such common part may be used in association with the communications protocol information indicating a communications protocol that may differ at least between the dedicated terminal 10A and the non-dedicated terminal 10D, or among the communication terminals 10 that are manufactured, sold, or managed by different organizations. Based on this knowledge, an administrator of the management system 50 may previously store association information in the communications protocol management table of FIG. 19.

(Functional Structure of Management System)

Referring back to FIG. 9, the data transmitter/receiver 51, which may be implemented by the network I/F 209 (FIG. 8) according to an instruction received from the CPU 201, transmits or receives various data or information to or from another terminal, device, or system through the communications network 2.

Under control of the CPU 201 (FIG. 8), the terminal authenticator 52 obtains a terminal ID and a password from the login request information that is received from the data transmitter/receiver 51. Using the terminal ID and the password as a search key, the terminal authenticator 52 searches the terminal information management DB 5002 (FIG. 13) to determine whether the obtained set of terminal ID and password is registered. Based on the search result, the terminal authenticator 52 determines whether the user at the terminal 10 or the terminal 10 is allowed for access.

The state manager 53, which operates according to an instruction received from the CPU 201 (FIG. 8), manages the operation state of the request terminal 10 that sends the login request information using the terminal state management DB 5003 (FIG. 14). More specifically, the state manager 53 stores the terminal ID of the request terminal 10, the operation state of the request terminal 10, the date and time at which the management system 50 receives the login request information from the request terminal 10, and the IP address of the request terminal 10. When the power switch 109 is changed from the "ON" state to the "OFF" state by the user, the state manager 53 receives the operation state information indicating that the power is turned off from the terminal 10, and changes the operation state of the terminal 10 from the "online" state to the "offline" state in the terminal state management table of FIG. 14.

The extractor 54, which operates according to an instruction received from the CPU 201 (FIG. 8), searches various management databases in the memory 5000 using a search key to obtain data that is associated with the search key.

For example, the extractor 54 searches the candidate list management DB 5004 (FIG. 15) using the terminal ID of the request terminal 10 as a search key to obtain a list of terminal IDs each assigned to a plurality of candidate terminals 10 each associated with the request terminal 10. Further, the extractor 54 searches the terminal state management DB 5003 (FIG. 14) using the terminal ID of each candidate terminal 10 that is extracted from the candidate list management DB 5004 as a search key to obtain the operation state information of each candidate terminal 10. Accordingly, the extractor 54 obtains the operation state of each of the candidate terminals 10, which are previously associated with the request terminal 10 that sends the login request information. The operation state information of each of the candidate terminals 10 is transmitted to the request terminal 10 for display such that the user at the request terminal 10 is able to know the operation state of each of the candidate terminals 10.

Additionally, the extractor 54 searches the candidate list management DB 5004 (FIG. 15) using the terminal ID of the request terminal 10 as a key to obtain a terminal ID of another request terminal 10 that registers the request terminal 10 as a candidate terminal for another request terminal 10. The extractor 54 searches the terminal state management DB 5003 (FIG. 14) using the terminal ID that is extracted as a key to obtain the operation state information of the request terminal 10 that sends the login request information. The operation state information of the request terminal 10 is transmitted to another request terminal 10 for display such that the user at another request terminal 10 is able to know the operation state of the request terminal 10.

In another example, the extractor 54 searches the terminal state management table (FIG. 14) using the terminal ID of the terminal 10, which may be received at the data transmitter/receiver 51, to extract the IP address of the terminal 10. Using the IP address of the terminal 10, the management system 50 is able to transmit information to the terminal 10. In another example, the extractor 54 searches the communications protocol management table (FIG. 19) using the terminal ID of the terminal 10, which may be received at the data transmitter/receiver 51, to extract communications protocol information of the terminal 10. Using the communications protocol information, the management system 50 is able to know a communications protocol compatible with the terminal 10. Further, the management system 50 determines whether the terminal 10 is the dedicated terminal or the non-dedicated terminal, based on the communications protocol information, or the request terminal 10 and the counterpart terminal 10 can communicate with each other using the same communications protocol.

In another example, such as when the terminal 10 is the non-dedicated terminal, the extractor 54 searches the conversion management table (FIG. 17) using the terminal ID of the terminal 10, which may be received at the data transmitter/receiver 51, as a search key to extract the IP address of the conversion system 80 and the IP address of the non-dedicated terminal 10, which are stored in association with the received terminal ID.

In another example, the extractor 54 searches the quality management table (FIG. 18) stored in the quality management DB 5007 using the delay time information received at the data transmitter/receiver 51 as a search key to extract image quality information of the image data. Based on the extracted image quality information, the management system 50 may change quality of image data to be transmitted.

In another example, the extractor 54 searches the terminal state management table (FIG. 14) stored in the terminal state management DB 5003 using the IP address of the counterpart terminal 10 as a search key to obtain the terminal ID of the counterpart terminal 10.

The determiner 55, which operates according to an instruction received from the CPU 201 (FIG. 8), determines whether the communications protocol being used by the counterpart terminal 10 is the predetermined communications protocol being used by the dedicated terminal 10A. Further, before sending information to a specific terminal 10, the determiner 55 determines whether the operation state information indicating the current operation state of the specific terminal 10 indicates "online". When it is determined that the operation state of the specific terminal 10 is online, the determiner 55 determines that information such as the operation state information of another terminal is to be transmitted to the specific terminal 10. When it is determined that the operation state of the specific terminal 10 is not online, the determiner 55 determines that information such as the operation state information of another terminal is not to be transmitted to the specific terminal 10. In this example, it is determined that the operation state of the specific terminal 10 is not online, when the operation state of the specific terminal 10 is offline or when the operation state of the specific terminal 10 is unknown.

The session manager 56, which operates according to an instruction received from the CPU 201 (FIG. 8), stores the relay device ID of the relay device 30 for relaying contents data, the terminal ID of the request terminal 10, the terminal ID of the counterpart terminal 10, the delay time "ms" indicating delay in time at which the image data is received at the counterpart terminal 10, and the received date and time at which the delay time information transmitted from the counterpart terminal is received at the management system 50, in a corresponding manner, in the session management DB 5005 (FIG. 16) of the memory 5000. The session manager 56 further generates a session ID for identifying a session to be used for establishing the communication session.

The quality determiner 57, which operates according to an instruction received from the CPU 201 (FIG. 8), searches the quality management DB 5007 (FIG. 18) using the delay time ms obtained for the selected relay device 30 to obtain the image data quality that is desirable for communication using the relay device 30. More specifically, the quality determiner 57 determines the image quality of the image data to be relayed by the relay device 30, based on the image quality information of the image data that is extracted by the extractor 54.

The delay time manager 58, which operates according to an instruction received from the CPU 201 (FIG. 8), manages the session management table of FIG. 16 stored in the session management DB 5005 so as to keep updated the value stored in the "delay time" field for the terminal ID of the counterpart terminal 10 that is extracted by the extractor 54.

The memory control 59, which operates according to an instruction received from the CPU 201 (FIG. 8) in cooperation with the HDD 205 (FIG. 8), stores various data in the memory 5000 or read out various data from the memory 5000.

<Functional Structure of Conversion System>

The conversion system 80 includes a data transmitter/receiver 81, a communications protocol converter 82, and a memory control 89. These units shown in FIG. 9 correspond to a plurality of functions or functional modules, which are executed according to an instruction of the CPU 201 (FIG. 8) that is generated according to the conversion control program being loaded from the HD 204 onto the RAM 203. The conversion system 80 further includes a memory 8000, which may be implemented by the HD 204 (FIG. 8) or the RAM 203. The memory 8000 stores conversion rule data, which is used for converting contents data.

(Functional Structure of Conversion System)

Referring now to FIGS. 8 and 9, a functional structure of the conversion system 80 is explained according to an example embodiment of the present invention.

The data transmitter/receiver 81 of the conversion system 80 of FIG. 9, which may be implemented by an instruction from the CPU 101 (FIG. 8) in cooperation with the network I/F 111 (FIG. 8), transmits or receives various data or information to or from another terminal, apparatus, or system, through the communications network 2. The data transmitter/receiver 81 transmits session start request information, which instructs to start a communication session (the third communication session), to the counterpart terminal having the IP address that is received from the relay device 30. In alternative to using the IP address, any other information indicating the counterpart terminal may be used such as the Uniform Resource Identifier (URI) of the counterpart terminal.

The communications protocol converter 82 converts the contents data transmitted from the request terminal 10 or the contents data transmitted from the counterpart terminal 10 according to the conversion rule data stored in the memory 8000, such that the converted contents data has a communications protocol compatible with the counterpart terminal 10 or the request terminal 10.

The memory control 89, which operates according to an instruction received from the CPU 201 (FIG. 8) in cooperation with the HDD 205 (FIG. 8), stores various data in the memory 8000 or read out various data from the memory 8000.

<Operations of Communication System>

Referring now to FIGS. 6, 9, and 20 to 23, operation of displaying a candidate list before starting communications between two dedicated terminals 10A, performed by the communication system 1, is explained according to an example embodiment of the present invention. In the following examples, it is assumed that the terminal 10aa and the terminal 10ca are both implemented as the dedicated terminals 10A.

Figure 20:
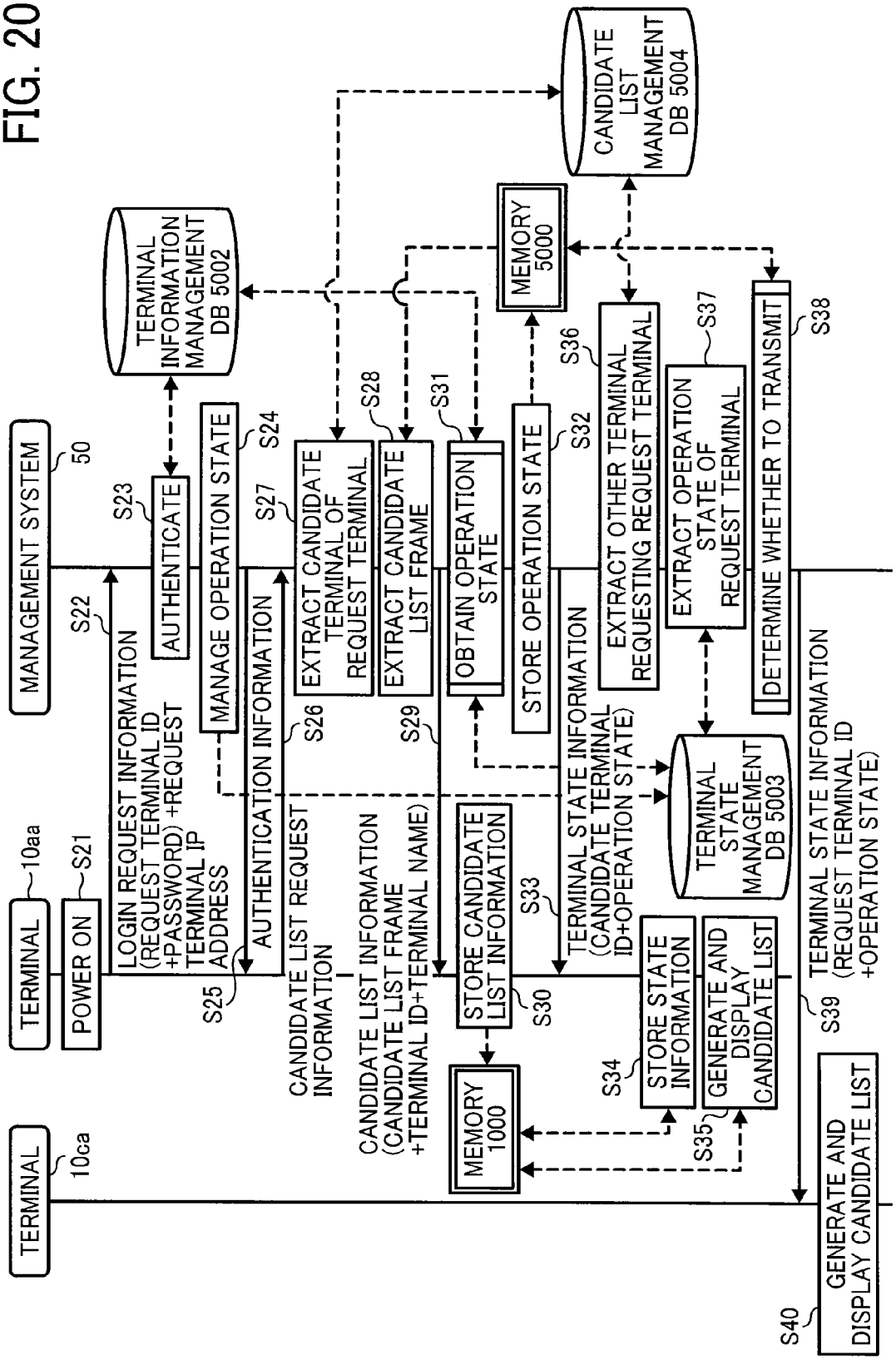
FIG. 20 is a data sequence diagram illustrating operation of establishing communication among two or more terminals of the communication system of FIG. 1, according to an example embodiment of the present invention.

FIG. 20 is a data sequence diagram illustrating operation of processing a request for starting communication with a counterpart terminal, which is generated by a request terminal, according to an example embodiment of the present invention.

At S21, the user at the request terminal 10aa, which is the dedicated terminal 10A, turns on the power of the request terminal 10aa through the power switch 109 (FIG. 6). The operation input 12 (FIG. 9) of the request terminal 10aa turns on the power of the request terminal 10aa.

At S22, as the power of the request terminal 10aa is turned on, the login request 13 of the request terminal 10aa automatically causes the data transmitter/receiver 11 to send the login request information that requests the login process to the management system 50 through the communications network 2. The login request information includes a terminal ID that identifies the request terminal 10aa, and a password assigned to the request terminal 10aa. The terminal ID and the password may be obtained by the memory control 19 from the memory 1000, and sent to the data transmitter/receiver 11. At the time of sending the login request information from the request terminal 10aa to the management system 50, the request terminal 10aa sends an IP address of the request terminal 10aa such that the management system 50 can obtain the IP address of the request terminal 10aa.

At S23, the terminal authenticator 52 of the management system 50 searches the terminal information management table (FIG. 13) stored in the memory 5000 using the terminal ID and the password of the login request information received through the data transmitter/receiver 51. When it is determined that the terminal ID and the password of the login request information is stored in the terminal information management DB 5002, the terminal authenticator 52 determines that the terminal 10aa is authenticated.

At S24, when the terminal authenticator 52 authenticates that the login request information is received from the authenticated terminal 10, the state manager 53 of the management system 50 stores the operation state, the date and time at which the login request information is received, and the IP address of the terminal 10aa, with respect to the terminal ID and the terminal name of the terminal 10aa in the terminal state management table (FIG. 14) to create a record of the terminal 10aa. Using the terminal state management table of FIG. 14, which stores the operations state of online, the date and time of "13:40, Nov. 10, 2011", and the terminal IP address of "1.2.1.3" in association with the terminal ID "01aa" and the terminal name "AA Terminal", various information regarding the terminal 10aa can be managed.

At S25, the data transmitter/receiver 51 of the management system 50 sends the authentication result obtained by the terminal authenticator 52 to the request terminal 10aa that has sent the login request information through the communications network 2. As described above, in this example, it is assumed that the terminal authenticator 52 determines that the terminal 10aa is an authenticated terminal.

At S26, the data transmitter/receiver 11 of the request terminal 10aa transmits candidate list request information that requests for a candidate list, to the management system 50 through the communications network 2. The data transmitter/receiver 51 of the management system 50 receives the candidate list request information.

At S27, the extractor 54 of the management system 50 searches the candidate list management table (FIG. 15) using the terminal ID "01aa38 of the request terminal 10aa that has sent the login request information and the candidate list request information as a search key to extract a terminal ID of a terminal 10 that is previously registered for the request terminal 10aa. The extractor 54 further searches the terminal state management table (FIG. 14) using the extracted terminal ID of the counterpart terminal to obtain a terminal name of the counterpart terminal 10. In this example, it is assumed that a terminal ID of the terminal 10ca that is the dedicated terminal 10A, and a terminal ID of the terminal 10*da* that is the non-dedicated terminal 10D are respectively obtained as the terminal ID of the candidate counterpart terminal 10.

At S28, the extractor 54 reads out candidate list frame data from the memory 5000. At S29, the data transmitter/receiver 51 transmits candidate list information to the request terminal 10*aa*. The candidate list information includes the candidate list frame data extracted at S28, and the terminal ID and the terminal name of the candidate counterpart terminal 10 that are extracted at S27. The data transmitter/receiver 11 of the terminal 10*aa* receives the candidate list information.

At S30, the memory control 19 of the request terminal 10*aa* stores the candidate list information in the memory 1000.

In this manner, rather than causing each terminal 10 to manage the candidate list information, the management system 50 centrally manages the candidate list information for all of the terminals 10 that are registered to the communication system 1. As the candidate list information is centrally managed at the management system 50, any change in the communication system 1 can be easily reflected in a timely manner without requiring the user at each terminal 10 to change any settings. For example, the management system 50 is able to update the candidate list information to reflect when a new terminal 10 is added to the communication system 1, when a new type of terminal 10 is introduced to the communication system 1, or when the design for the candidate list frame is changed.

At S31, the management system 50 extracts the operation state of the candidate counterpart terminal 10.

Figure 21:
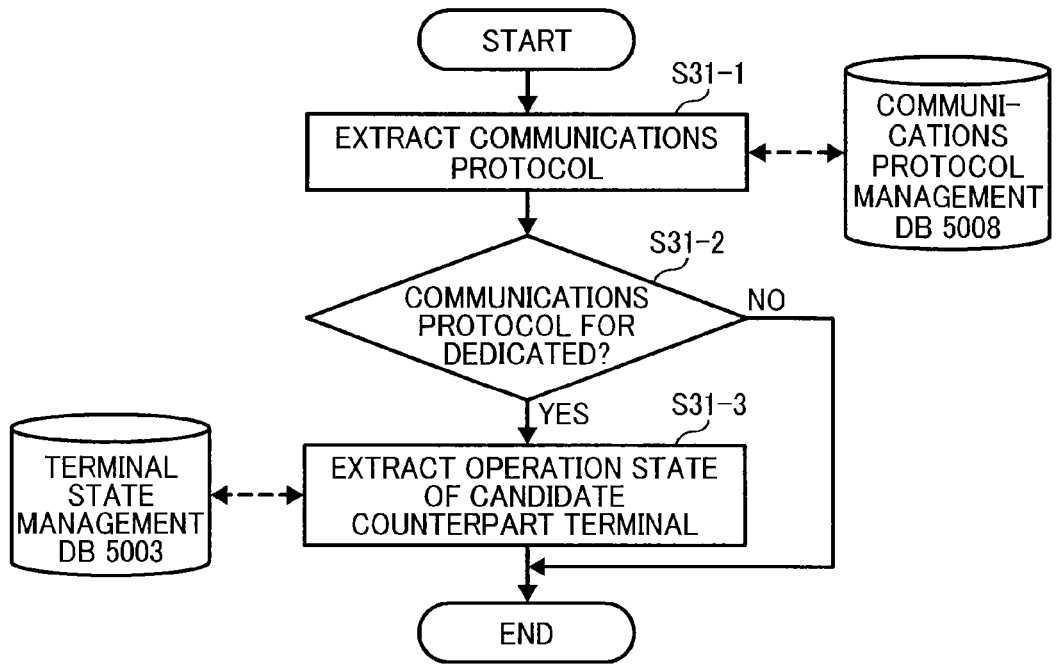
FIG. 21 is a flowchart illustrating operation of extracting an operation state of the terminal, according to an example embodiment of the present invention.

Referring now to FIG. 21, operation of extracting the operation state of the candidate counterpart terminal 10, performed by the management system 50 at S31, is explained according to an example embodiment of the present invention.

At S31-1, the extractor 54 searches the communications protocol management table (FIG. 19) using the terminal ID prefix of the candidate counterpart terminal 10 that is obtained at S27, to obtain the communications protocol information of the candidate counterpart terminal.

At S31-2, the determiner 55 determines whether a communications protocol specified by the extracted communications protocol information is a communications protocol to be used by the request terminal 10*aa* that is the dedicated terminal 10A. More specifically, the determiner 55 determines whether the communications protocol of the counterpart terminal 10 is the same as the communications protocol to be used by the request terminal 10*aa* that is the dedicated terminal 10A. It is determined that the communications protocol is the same for the request terminal 10 and the candidate counterpart terminal 10 when a call control protocol and an encoding format are both the same. When at least one of the call control protocol and the encoding format is different, it is determined that the communications protocol is different between the request terminal 10*aa* and the counterpart terminal 10.

When it is determined that the communications protocol is the same for the candidate counterpart terminal 10 and the request terminal 10*aa* ("YES" at S31-2), the operation proceeds to S31-3. At S31-3, the extractor 54 searches the terminal state management table (FIG. 14) stored in the terminal state management DB 5003 using the terminal ID of the candidate counterpart terminal 10 as a search key to obtain the operation state information of the candidate counterpart terminal 10, and the operation ends. When it is determined that the communications protocol is different between the candidate counterpart terminal 10 and the request terminal 10*aa* ("NO" at S31-2), the operation ends without performing S31-3.

Referring back to FIG. 20, at S32, the memory control 59 stores the operation state information of the candidate counterpart terminal 10, which is extracted at S31, in the memory 5000 in association with the terminal ID of the candidate counterpart terminal 10. In case the operation state information of the candidate counterpart terminal 10 is not extracted at S31, the memory control 59 stores operation state information (second operation state information) indicating that the operation state is unknown, in the memory 5000 in association with the terminal ID of the candidate counterpart terminal 10.

More specifically, in this example, the extractor 54 obtains the communications protocol information "dedicated" for the counterpart terminal 10*ca* from the communications protocol management table of FIG. 19, using the terminal ID prefix "01" of the counterpart terminal 10*ca*. The extractor 54 further obtains the communications protocol information "non-dedicated" for the counterpart terminal 10*da* from the communications protocol management table of FIG. 19, using the terminal ID prefix "20" of the counterpart terminal 10*da*. For the counterpart terminal 10*ca* that is the dedicated terminal 10A, the determiner 55 causes the extractor 54 to refer to the terminal state management table of FIG. 14 and obtain the operation state information "online, communication OK". The memory control 59 stores the operation state information "online, communication OK" for the counterpart terminal 10*ca*, and the operation state information "unknown" for the counterpart terminal 10*da*.

At S33, the data transmitter/receiver 51 transmits terminal state information of the candidate counterpart terminal 10 that is extracted at S27, to the request terminal 10*aa* through the communications network 2. The terminal state information of the candidate counterpart terminal includes a terminal ID of the counterpart terminal, and the operation state information. More specifically, in this example, the data transmitter/receiver 51 transmits terminal state information including the terminal ID "01*ca*" and the operation state information "online, communication OK", to the request terminal 10*aa* through the communications network 2. Further, the data transmitter/receiver 51 transmits terminal state information including the terminal ID "20*da*" and the operation state information "unknown", to the request terminal 10*aa* through the communications network 2. In this example, the terminal state information of the candidate counterpart terminal may be sent, one by one, for each candidate counterpart terminal. Alternatively, the terminal state information of more than one candidate counterpart terminal may be sent at once.

In alternative to transmitting the operation state information "unknown" of the non-dedicated terminal, the management system 50 may generate, store, and transmit operation state information indicating that the communications protocol used by the counterpart terminal is different from the communications protocol used by the request terminal 10*aa*.

Further, in this example, in case the management system 50 is not able to obtain the operation state information of the counterpart terminal, even when the counterpart terminal is the dedicated terminal, the data transmitter/receiver 51 transmits the operation state information "offline" to the request terminal 10*aa*. For example, the counterpart terminal 10 may not be available for communication due to a trouble in communications network 2 or a trouble in the counterpart terminal 10. In this manner, the operation state information "unknown" is not transmitted to the request terminal 10*aa*, when the counterpart terminal 10 is the dedicated terminal.

In addition to transmitting the operation state information of the candidate counterpart terminal, the data transmitter/receiver 51 may send the terminal state information of the request terminal 10aa, which includes the terminal ID of the request terminal 10aa and the operation state information of the request terminal 10aa.

At S34, the memory control 19 of the request terminal 10aa stores the terminal state information, which is received from the management system 50, in the memory 1000. In case the terminal state information is received for a plurality of candidate counterpart terminals 10, the memory control 19 may store the terminal state information, one by one, as it is received from the management system 50.

In this manner, the request terminal 10aa is able to obtain the current operation state of the counterpart terminal 10ca, when the counterpart terminal 10ca is the dedicated terminal 10A capable of communicating with the request terminal 10aa using the same communications protocol. Further, the request terminal 10aa is able to know that the counterpart terminal 10da is the non-dedicated terminal 10D such that the current operation state of the terminal 10da is unknown. Alternatively or additionally, the request terminal 10aa is able to know that the counterpart terminal 10da is the non-dedicated terminal 10D that communicates using a different communications protocol such that the current operation state of the terminal 10da is unknown.

At S35, the candidate list generator 18 of the request terminal 10aa generates a candidate list that reflects the operation state of each of the candidate counterpart terminals 10, based on the candidate list information and the terminal state information that are stored in the memory 1000. The memory control 16 causes the display 120aa to display the candidate list. To reflect the operation state of the candidate counterpart terminal 10, the candidate list generator 18 searches the visual information management table (FIG. 10) using the operation state information to extract the visual information associated with the operation state information. The candidate list generator 18 assigns the visual information for each candidate counterpart terminal, such that the visual information is displayed within the candidate list frame, side by side, with the terminal ID and the terminal name.

Figure 22:
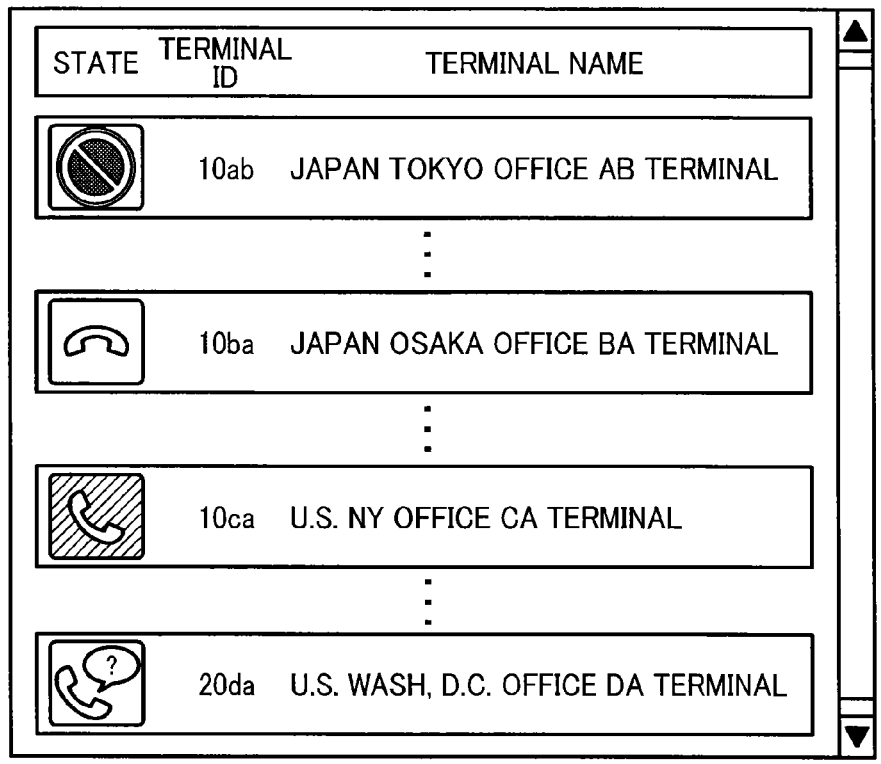
FIG. 22 is an example screen illustrating a candidate list, displayed through a display provided for the communication terminal of FIG. 6.

FIG. 22 is an example screen including a candidate list, which is displayed at the request terminal 10aa. Referring to FIG. 22, a candidate list frame is provided for each candidate counterpart terminal. Within the candidate list frame, visual information indicating the operation state of the candidate counterpart terminal 10, the terminal ID, and the terminal name are displayed, side by side. The screen of FIG. 22 further includes a scroll bar at the right side. Through moving the scroll bar upward or downward, the screen of FIG. 22 displays different portion of the candidate list to change a set of candidate list frames, or a set of candidate counterpart terminals, being displayed on the screen.

Referring back to FIG. 20, at S36, the extractor 54 of the management system 50 searches the candidate list management table (FIG. 15) using the terminal ID "01aa" of the request terminal 10aa that has sent the login request information to obtain the terminal ID of one or more terminals 10 each of which registers the request terminal 10aa as one of its candidate terminals 10. In this example, it is assumed that the terminal IDs "01ba", "01ca", and "20da" of the terminal 10ba, 10ca, and 10da are extracted.

At S37, the extractor 54 of the management system 50 searches the terminal state management table (FIG. 14) using the terminal ID "01aa" of the request terminal 10aa as a search key to extract the operation state information of the request terminal 10aa. Further, the extractor 54 searches the terminal state management table (FIG. 14) using the terminal ID "01ba", "01ca.", and "20da", which are extracted at S36, to extract the operation state information of another terminal 10 that has registered the request terminal 10aa as the candidate terminal. The extracted operation state information may be stored in the memory 5000, in association with the terminal ID, for each one of the request terminal 10aa and the other terminals 10ba, 10ca, and 10da.

At S38, the management system 50 determines whether to transmit the operation state information of the request terminal 10aa to each one of the terminals 10ba, 10ca, and 10da, which are identified at S36, for example, as described below referring to FIG. 23.

Figure 23:
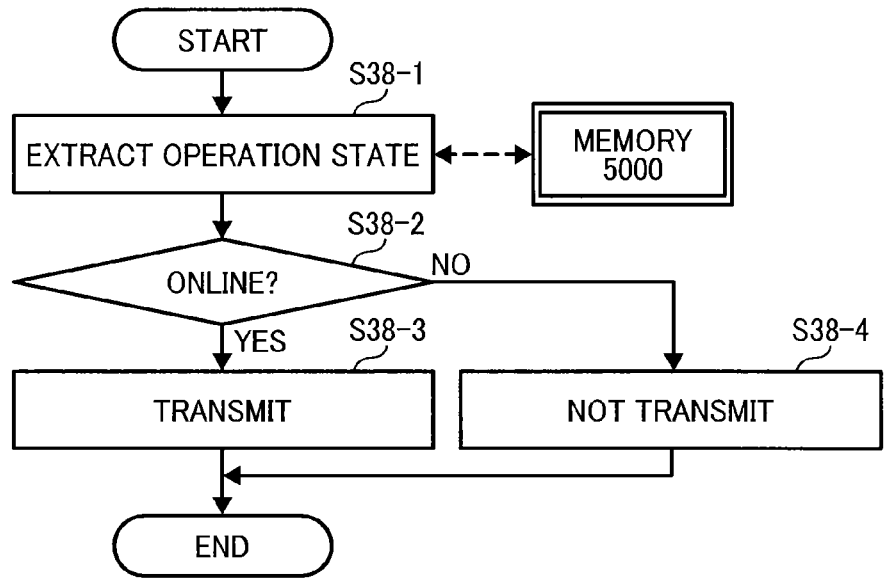
FIG. 23 is a flowchart illustrating operation of determining whether data can be transmitted to a specific communication terminal based on an operation state of the specific terminal, according to an example embodiment of the present invention.

Referring to FIG. 23, at S38-1, the extractor 54 extracts the operation state information and the terminal ID of the terminal identified at S36, which is stored in the memory 5000 at S37.

At S38-2, the determiner 55 determines whether the operation state information extracted at S38-1 indicates the "online" state. When it is determined that the operation state information indicates the "online" state ("YES" at S38-2), the operation proceeds to S38-3. At S38-3, the determiner 55 determines to transmit the operation state information of the request terminal 10aa to the other terminal 10, and the operation ends. When it is determined that the operation state information does not indicate the "online" state ("NO" at S38-2), the operation proceeds to S38-4. At S38-4, the determiner 55 determines not to transmit the operation state information of the request terminal 10aa to the other terminal 10, and the operation ends.

In this example, the determiner 55 determines that the operation state information does not indicate the "online" state, when the operation state information indicates either the "offline" state or the "unknown" state. In this example, it is assumed that the terminals 10ba and 10ca are each implemented as dedicated terminal 10A, and the terminal 10da is implemented by the non-dedicated terminal 10D.

Accordingly, the management system 50 transmits the operation state information of the request terminal 10aa to the terminal 10ca that is the dedicated terminal 10A and is in the online state, but not to the terminal 10ba having the offline state and the terminal 10da that is the non-dedicated terminal 10D.

Referring back to FIG. 20, at S39, the data transmitter/receiver 51 of the management system 50 transmits the terminal state information of the request terminal 10aa, to the terminal 10ca based on the determination obtained at S38. The terminal state information includes the terminal ID "01aa" and the operation state information of the request terminal 10aa. The data transmitter/receiver 11 of the terminal 10ca receives the terminal state information.

At S40, the candidate list generator 18 of the terminal 10ca generates a candidate list that reflects the current operation state of the request terminal 10aa, and causes the display 120ca to display a candidate list, in a substantially manner as described above referring to S35.

Figure 24:
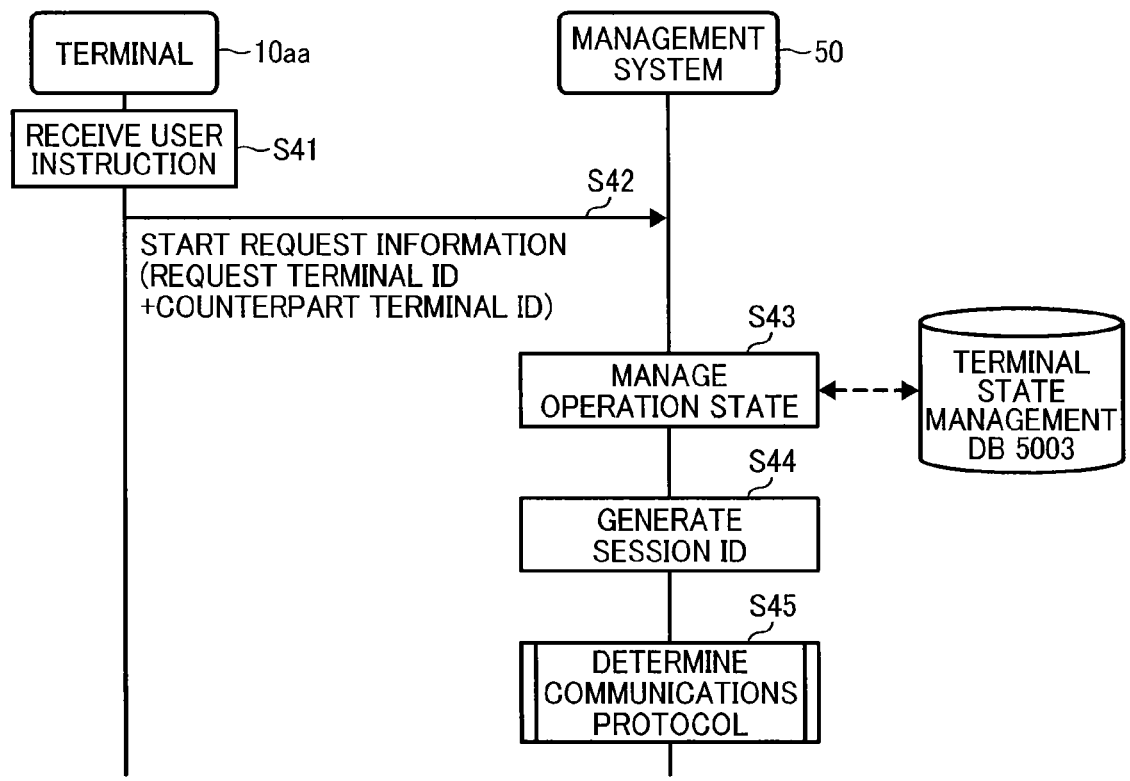
FIG. 24 is a data sequence diagram illustrating operation of processing a request for starting communication between or among the communication terminals of the communication system of FIG. 1.

Referring now to FIGS. 6, 9, and 24 to 27, operation of starting communications between two dedicated terminals 10A, performed by the communication system 1, is explained according to an example embodiment of the present invention. FIG. 24 is a data sequence diagram illustrating operation of processing a request for starting communications with the counterpart terminal 10, performed by the management system 50 in cooperation with the request terminal 10, according to an example embodiment of the present invention.

Referring to FIG. 24, at S41, the user at the request terminal 10aa that is the dedicated terminal 10A, operates the operation key 108 (FIG. 6) to select the terminal 10*ca* as a counterpart terminal. Upon selection, the operation input 12 (FIG. 9) of the request terminal 10*aa* receives a user instruction for starting communications with the counterpart terminal 10*ca*.

At S42, the data transmitter/receiver 11 of the request terminal 10*aa* sends the communication start request information that requests the management system 50 to start communication with the counterpart terminal 10*ca* to the management system 50. The communication start request information at least includes the terminal ID "01*aa*" of the request terminal 10*aa* and the terminal ID "01*ca*" of the counterpart terminal 10*ca*.

At S43, the state manager 53 (FIG. 9) of the management system 50 looks for records in the terminal state management DB 5003 (FIG. 14) based on the terminal ID "01*aa*" of the request terminal 10*aa* and the terminal ID "01*ca*" of the counterpart terminal 10*ca*, which are included in the communication start request information. The state manager 53 changes each of the operation states of the request terminal 10*aa* and the counterpart terminal 10*ca* in the records, from the "online, communication OK" state to the "online, communicating" state. At this time, the request terminal 10*aa* and the counterpart terminal 10*ca* have not started communication, but the request terminal 10*aa* and the counterpart terminal 10*ca* each have the communicating state. In case another terminal 10 tries to communicate with the request terminal 10*aa* or the counterpart terminal 10*ca*, the management system 50 causes the another terminal 10 to output voice or display indicating that the request terminal 10*aa* or the counterpart terminal 10*ca* is in the communicating state.

At S44, the session manager 56 of the management system 50 generates a session ID for a session that is to be established between the request terminal 10*aa* and the counterpart terminal 10*ca*.

At S45, the management system 50 determines a communications protocol to be used by the counterpart terminal 10*ca*, for example, as described below referring to FIG. 25.

Figure 25:
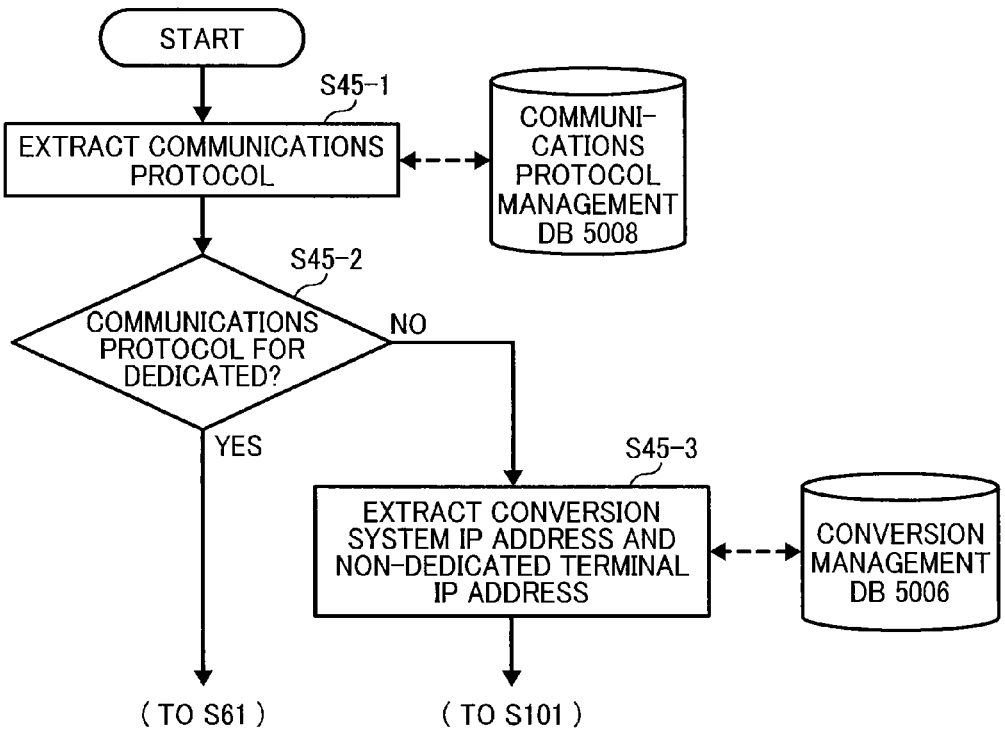
FIG. 25 is a flowchart illustrating operation of determining a communications protocol to be used by the communication terminal of the communication system of FIG. 1.

Referring to FIG. 25, at S45-1, the extractor 54 searches the communications protocol management table (FIG. 19) using the terminal ID prefix "01" of the terminal ID "01*ca*" of the counterpart terminal 10*ca*, which is received at the data transmitter/receiver 51, to extract communications protocol information of the counterpart terminal 10*ca*.

At S45-2, the determiner 55 determines whether the communications protocol specified by the extracted communications protocol information is the same as the communications protocol used by the request terminal 10*aa*. More specifically, the determiner 55 determines whether the communications protocol of the counterpart terminal 10*ca* is the communications protocol used by the request terminal 10*aa* that is the dedicated terminal 10A. The determiner 55 determines that the communications protocol is the same when both of the call control protocol and the encoding format are the same. When at least one of the call control protocol and the encoding format is different, the determiner 55 determines that the communications protocol is different between the counterpart terminal 10*ca* and the request terminal 10*aa*.

Figure 26:
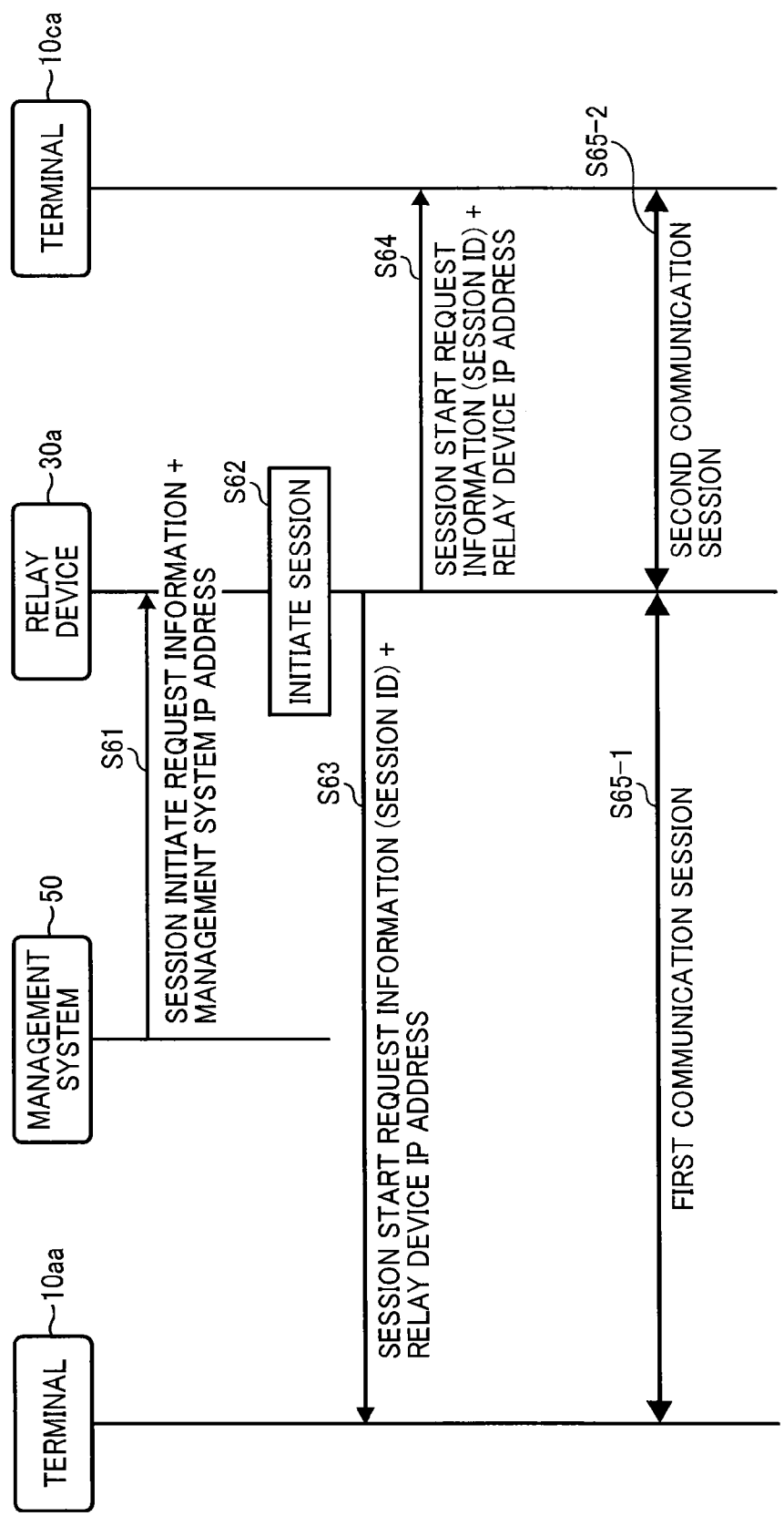
FIG. 26 is a data sequence diagram illustrating operation of establishing a communication session, before starting communication between the communication terminals of the communication system of FIG. 1 when the communications protocol is the same for the communication terminals.

When it is determined that the communications protocol is the same ("YES" at S45-2), the operation proceeds to S61 of FIG. 26. When it is determined that the communications protocol is different ("NO" at S45-2), the operation proceeds to S45-3.

In this example, the counterpart terminal 10*ca* is the dedicated terminal 10A, which communicates using the communications protocol that is the same as the communications protocol of the request terminal 10*aa*. In such case, the operation proceeds to FIG. 26 to establish a communication session between the dedicated communication terminals 10A. Further, in this example illustrated in FIG. 26, the relay device 30*a*, which is connected to the request terminal 10*aa* through the LAN 2*a*, is selected as a relay device to relay contents data between the request terminal 10*aa* and the counterpart terminal 10*ca*.

Referring to FIG. 26, at S61, the data transmitter/receiver 51 of the management system 50 transmits session initiate request information, which requests to initiate a communication session being established by the relay device 30*a*, to the relay device 30*a*. The session initiate request information includes the session ID generated at S44, the IP address of the request terminal 10*aa*, and the IP address of the counterpart terminal 10*ca*. The IP addresses of the terminals 10 are managed by the management system 50 using the terminal state management table of FIG. 14. The management system 50 further transmits the IP address of the management system 50 to the relay device 30*a* together with the session initiate request information. The data transmitter/receiver 31 of the relay device 30*a* receives the session initiate request information and the IP address of the management system 50.

At S62, the data transmitter/receiver 31 of the relay device 30*a* initiates a contents data communication session.

At S63, the data transmitter/receiver 31 of the relay device 30*a* transmits session start request information, which requests to start a communication session, to the request terminal 10*aa*. The session start request information includes the session ID received from the management system 50. The relay device 30*a* further sends the IP address of the relay device 30*a* to the request terminal 10*aa*, with the session start request information. The data transmitter/receiver 11 of the request terminal 10*aa* receives the session start request information and the IP address of the relay device 30*a*.

At S64, the data transmitter/receiver 31 transmits session start request information, which requests to start a communication session, to the counterpart terminal 10*ca*. The session start request information includes the session ID received from the management system 50. The relay device 30*a* further sends the IP address of the relay device 30*a* to the counterpart terminal 10*ca*, with the session start request information. The data transmitter/receiver 11 of the counterpart terminal 10*ca* receives the session start request information and the IP address of the relay device 30*a*.

At S65-1, the request terminal 10*aa* and the relay device 30*a* establish a contents data communication session, that is, the first communication session "sed1" of FIG. 2, to transmit or receive contents data.

At S65-2, the counterpart terminal 10*ca* and the relay device 30*a* establish a contents data communication session, that is, the second communication session "sed2" of FIG. 2, to transmit or receive contents data.

Figure 27:
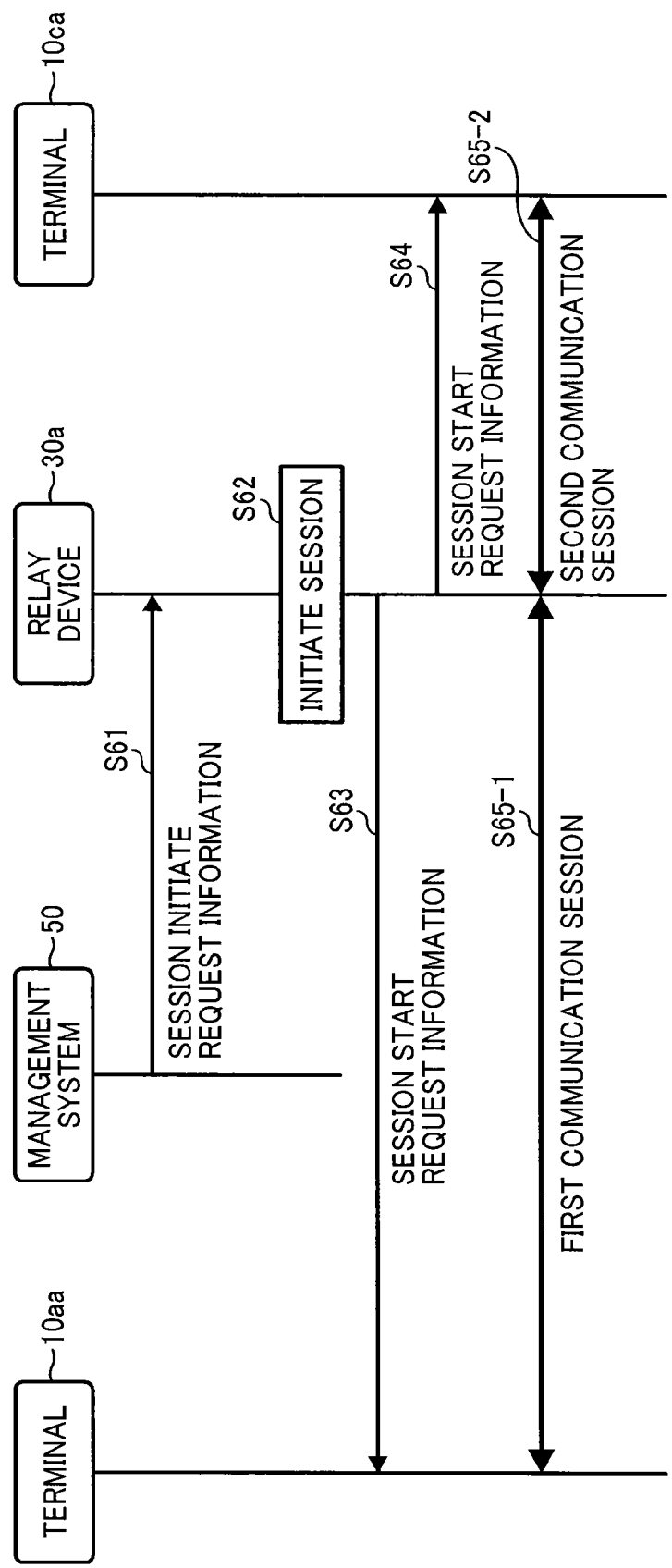
FIG. 27 is a data sequence diagram illustrating operation of transmitting or receiving data between the communication terminals of the communication system of FIG. 1, when the communications protocol is the same for the communication terminals.

Referring now to FIG. 27, operation of transmitting and receiving contents data such as image data and sound data between the request terminal and the counterpart terminal to carry out videoconference, performed by the communication system 1, is explained according to an example embodiment of the present invention. FIG. 27 is a data sequence diagram illustrating operation of transmitting or receiving contents data between the dedicated terminals 10A. In this example, the contents data such as the image data and the sound data flows in a direction from the request terminal 10*aa* to the counterpart terminal 10*ca*, or in another direction from the counterpart terminal 10*ca* to the request terminal 10*aa*. Since operation such as transmission and reception of the contents data or detection of delay time is the same for both of the directions, the following example focuses on communication in which data flows from the request terminal 10aa to the counterpart terminal 10ca.

Referring to FIG. 27, at S81, the data transmitter/receiver 11 of the request terminal 10aa sends the contents data to the relay device 30a through the communications network 2 in the contents data communications session "sed1". The contents data includes image data such as image data of an object captured by the imaging unit 14 and sound data that is input through the sound input 15a. In this example, it is assumed that the high-quality image data based on the low-level resolution image data, the medium-level resolution image data, and the high-level resolution image data, and the sound data, are transmitted. Accordingly, the data transmitter/receiver 31 of the relay device 30a receives the image data of three different resolution levels, and the sound data.

At S82, the data quality checker 33 searches the data quality management DB 3001 (FIG. 11) using the IP address "1.3.1.3" of the counterpart terminal 10ca as a key to obtain the image quality information, and to determine whether to change quality of image data to be transmitted to the relay device 30a or interrupt transmission of image data.

In this example, the quality of image data to be transmitted to the relay device 30a is the high-quality image data. Since the image data that is received at the data transmitter/receiver 31 has the quality that is the same as the quality of the image data obtained from the data quality management DB 3001, at S83, the relay device 30a sends the high-quality image data and the sound data to the counterpart terminal 10ca in the contents data communication session "sed2", without applying further image processing.

The counterpart terminal 10ca receives the high quality image data that is generated based on the low-level resolution image data, medium-level resolution image data, and high-level resolution image data, and the sound data, at the data transmitter/receiver 11. The display control 16 combines the image data of three different resolution levels into the high quality image data for display onto the display 120ca. Further, the sound output 15b outputs the sound based on the sound data.

At S84, the delay detector 17 of the counterpart terminal 10ca periodically detects a delay time indicating the time at which the image data is received at the data transmitter/receiver 11, for example, every one second. In this example, it is assumed that the delay time of 200 ms is obtained.

At S85, the data transmitter/receiver 11 of the counterpart terminal 10ca sends the delay information indicating the delay time of 200 ms to the management system 50 through the communications network 2, during the management data communication session "sei". With the delay information, the management system 50 is notified of the delay time, and the IP address "1.3.1.3" of the counterpart terminal 10ca that has sent the delay information.

At S86, the delay time manager 58 of the management system 50 searches the terminal state management DB 5003 (FIG. 14) using the IP address "1.3.1.3" of the counterpart terminal 10ca as a search key to extract the terminal ID "01ca" of the counterpart terminal 10ca. The delay time manager 60 stores the delay time of 200 ms obtained from the delay information in a "delay time" field of the record of the terminal ID "01ca" of the session management table stored in the session management DB 5005 (FIG. 16).

At S87, the quality determiner 58 searches the quality management DB 5007 (FIG. 18) using the delay time of 200 ms to extract the image quality information, that is, the image data quality of "MEDIUM". Based on the extracted image data quality, the quality determiner 58 determines that the quality of image data suitable for the delay time of 200 ms is medium.

At S88, the data transmitter/receiver 51 searches the relay device management DB 5001 (FIG. 12) using the relay terminal ID "111a", which is stored in the session management DB (FIG. 16) in association with the counterpart terminal ID "01ca", to extract the IP address "1.2.1.2" of the relay device 30a.

At S89, the data transmitter/receiver 51 sends the image quality information indicating the medium-level image data quality that has been determined at S87, to the relay device 30a through the communications network 2 during the management data communication session "sei". The image quality information is transmitted with the IP address "1.3.1.3" of the counterpart terminal 10ca, which was used as a search key at S86.

At S90, the data quality manager 34 of the relay device 30a stores the IP address "1.3.1.3" of the counterpart terminal 10ca in association with the "medium-level" quality image data to be relayed by the counterpart terminal 10ca, in the data quality management DB 3001 (FIG. 11).

At S91, the request terminal 10aa transmits the high quality image data including the low-level resolution image data, the medium-level resolution image data, and the high-level resolution image data, and the sound data, to the relay device 30a during the contents data communication session "sed1", in a substantially similar manner as described above referring to S81.

At S92, the data quality checker 33 of the relay device 30a searches the data quality management DB 3001 (FIG. 11) using the IP address "1.3.1.3" of the counterpart terminal 10ca as a search key to determine whether to extract the quality of the image data suitable for the counterpart terminal 10ca or to interrupt transmission of image data, in a substantially similar manner as described above referring to S82.

At S93, since the image data quality that is stored for the counterpart terminal 10ca is the medium-level, which is lower than the quality of the image data that is received at the data transmitter/receiver 31, the data quality changer 35 changes the quality of the image data from the high-level to the medium level. In this example, the quality of the sound data remains the same.

At S94, the data transmitter/receiver 31 of the relay device 30a sends the image data having the quality that is lowered to the medium-level, and the sound data, to the counterpart terminal 10ca through the communications network 2, during the contents data communication session "sed2". The data transmitter/receiver 11 of the counterpart terminal 10ca receives the medium-quality image data that is generated based on the low-level resolution image data and the medium-level resolution image data, and the sound data. The display control 16 of the counterpart terminal 10ca combines the image data of two different resolution levels to generate the medium-level image data for display on the display 120ca. Further, the sound output 15b outputs sounds generated based on the sound data.

As described above, when any delay in receiving the image data at the counterpart terminal 10ca is observed, the relay device 30a changes the quality of image data by lowering the quality of image data. Accordingly, the users participating the videoconference are able to carry out communication more smoothly. The management system 50 is able to provide the above-described services in controlling quality of image data, when the terminals 10 are dedicated terminals 10A.

Referring now to FIGS. 25, and 28 to 30, operation of transmitting or receiving contents data according to the second communications pattern, in which the dedicated terminal 10A and the non-dedicated terminal 10D communicate with each other, is explained according to an example embodiment of the present invention. In this example, it is assumed that the terminal 10aa that is the dedicated terminal 10A communicates with the terminal 10da that is the non-dedicated terminal 10D. More specifically, the communications protocol used by the dedicated terminal 10aa has a call control protocol that is the (4) IM protocol or the (7) extended IM based protocol, and the encoding format that is SVC. For the communications protocol used by the non-dedicated terminal 10da, the call control protocol is (1) session initial protocol (SIP) and the encoding format is AVC.

Before starting communications with the counterpart terminal 10da, the request terminal 10aa sends the login request information to the management system 50 in a substantially similar manner as described above referring to FIG. 20. In this example, however, the counterpart terminal 10ca is selected as one of the candidate counterpart terminals 10. For example, the counterpart terminal 10ca may be replaced by the counterpart terminal 10da, or the counterpart terminal 10da may be additionally included as one of candidate counterpart terminals 10 that may be selected by the request terminal 10aa.

Assuming that the user at the request terminal 10aa selects the counterpart terminal 10da to start communications at S41 of FIG. 24, the request terminal 10aa transmits the communication start request information including the terminal ID of the counterpart terminal 10da to the management system 50. The management system 50 prepares for a communication session in a substantially similar manner as described above referring to FIG. 24, except that the terminal ID of the counterpart terminal 10da is used as a search key. At S45-2 of FIG. 25, the determiner 55 of the management system 50 determines that the communications protocol of the counterpart terminal 10da is different from the communications protocol of the request terminal 10aa ("NO" at S45-2). In such case, the operation proceeds to S45-3.

At S45-3, the extractor 54 searches the conversion management table (FIG. 17) stored in the conversion management DB 5006 using the terminal ID "20da" of the counterpart terminal 10da, which is received at the data transmitter/receiver 51, to extract the IP address "1.3.2.2" of the conversion system 80 and the IP address "1.3.2.3" of the counterpart terminal 10da. The operation further proceeds to S101 of FIG. 28.

Figure 28:
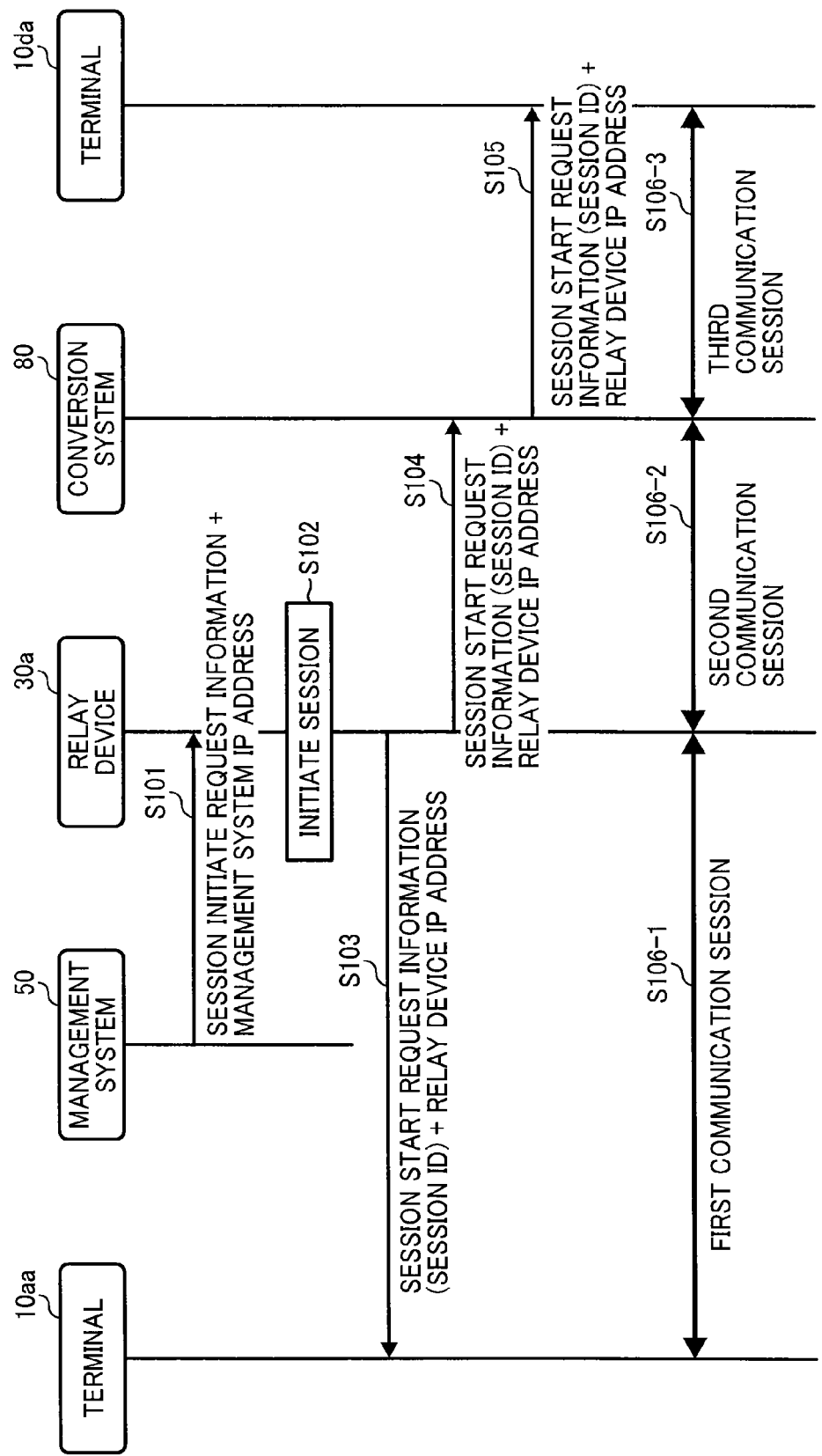
FIG. 28 is a data sequence diagram illustrating operation of establishing a communication session, before starting communication between the communication terminals of the communication system of FIG. 1 when the communications protocol is different between the communication terminals.

FIG. 28 is a data sequence diagram illustrating operation of establishing a contents data communication session between the dedicated terminal 10A and the non-dedicated terminal 10D, according to an example embodiment of the present invention. Further, in this example illustrated in FIG. 28, the relay device 30a, which is connected to the request terminal 10aa through the LAN 2a, is selected as a relay device to relay contents data between the request terminal 10aa and the counterpart terminal 10da.

At S101, the data transmitter/receiver 51 of the management system 50 transmits session initiate request information, which requests to initiate a contents data communication session, to the relay device 30a through the communications network 2. The session initiate request information includes a session ID that is generated at S44, the IP address of the request terminal 10aa, the IP address of the conversion system 80, and the IP address of the counterpart terminal 10da. The IP address of the request terminal 10aa may be obtained from the terminal state management table (FIG. 14). The IP address of the conversion system 80 and the IP address of the counterpart terminal 10da are extracted at S45-3.

The management system 50 further sends the IP address of the management system 50 to the relay device 30a, with the session initiate request information. The data transmitter/receiver 31 of the relay device 30a receives the session initiate request information and the IP address of the management system 50.

At S102, the data transmitter/receiver 31 of the relay device 30a initiates a contents data communication session.

At S103, the data transmitter/receiver 31 of the relay device 30a transmits session start request information, which requests to start a contents data communication session, to the request terminal 10aa. The session start request information includes the session ID received from the management system 50. The relay device 30a further sends the IP address of the relay device 30a to the request terminal 10aa, with the session start request information. The data transmitter/receiver 11 of the request terminal 10aa receives the session start request information and the IP address of the relay device 30a.

At S104, the data transmitter/receiver 31 of the relay device 30a transmits session start request information, which requests to start a contents data communication session, to the conversion system 80. The session start request information includes the session ID and the IP address of the counterpart terminal 10da, which are received from the management system 50. The relay device 30a further sends the IP address of the relay device 30a to the conversion system 80, with the session start request information. The data transmitter/receiver 81 of the conversion system 80 receives the session start request information and the IP address of the relay device 30a.

At S105, the data transmitter/receiver 81 of the conversion system 80 transmits session start request information, which requests to start a contents data communication session, to the counterpart terminal 10da. The session start request information includes the session ID received from the management system 50. The conversion system 80 further transmits the IP address of the conversion system 80, with the session start request information, to the counterpart terminal 10da. The data transmitter/receiver 11 of the counterpart terminal 10da receives the session start request information and the IP address of the conversion system 80.

At S106-1, the request terminal 10aa and the relay device 30a establish a contents data communication session, that is, the first communication session "sed11" of FIG. 4, to transmit or receive contents data.

At S106-2, the relay device 30a and the conversion system 80 establish a contents data communication session, that is, the second communication session "sed12" of FIG. 4, to transmit or receive contents data.

At S106-3, the conversion system 80 and the counterpart terminal 10da establish a contents data communication session, that is, the third communication session "sed13" of FIG. 4, to transmit or receive contents data.

Figure 29:
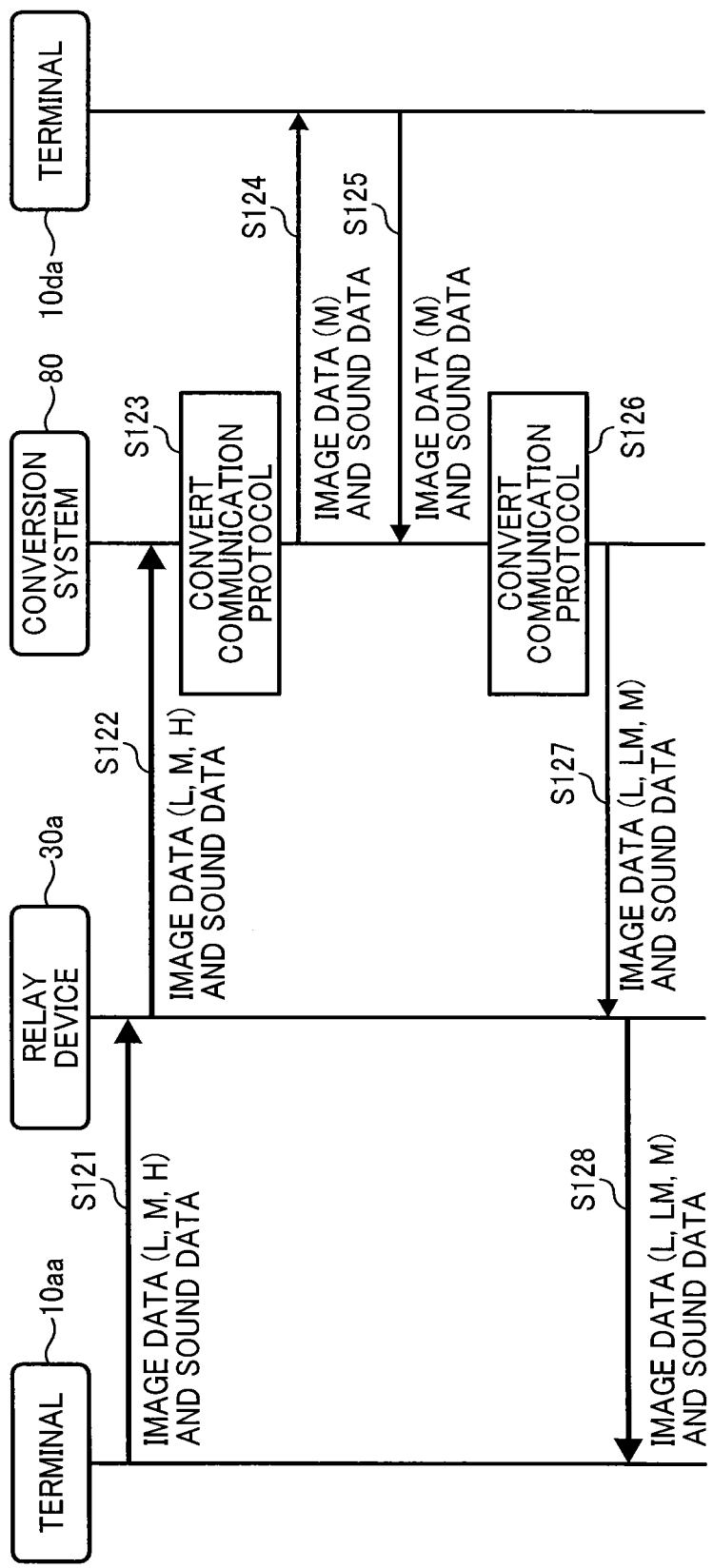
FIG. 29 is a data sequence diagram illustrating operation of transmitting or receiving data between the communication terminals of the communication system of FIG. 1, when the communications protocol is different between the communication terminals.

Referring now to FIG. 29, operation of transmitting and receiving contents data such as image data and sound data between the request terminal and the counterpart terminal to carry out videoconference, performed by the communication system 1, is explained according to an example embodiment of the present invention. In this example illustrated in FIG. 29, contents data is transmitted or received between the dedicated terminal 10A and the non-dedicated terminal 10D.

At S121, the data transmitter/receiver 11 of the request terminal 10aa sends the contents data to the relay device 30a through the communications network 2 in the first communication session "sed11". The contents data includes image data such as image data of an object captured by the imaging unit 14 and sound data that is input through the sound input 15a. In this example, it is assumed that the high-quality image data based on the low-level resolution image data, the medium-level resolution image data, and the high-level resolution image data, and the sound data, are transmitted. Accordingly, the data transmitter/receiver 31 of the relay device 30a receives the image data of three different resolution levels, and the sound data.

At S122, the data transmitter/receiver 31 of the relay device 30a transmits the contents data, which includes the image data of three different resolution levels and the sound data, to the conversion system 80 through the communications network 2, in the second communication session "sed12". Accordingly, the data transmitter/receiver 81 of the conversion system 80 receives the image data of three different resolution levels, and the sound data.

At S123, the communications protocol converter 82 of the conversion system 80 refers to conversion rule data stored in the memory 8000, and converts the image data of three different resolution levels and the sound data from a communications protocol of the request terminal 10aa to a communications protocol of the counterpart terminal 10da. In this example, the image data of three different resolution levels that are illustrated in FIGS. 3A to 3C is converted to the image data of one resolution level that is illustrated in FIG. 5. As described above referring to FIG. 5, the image data of FIG. 5 has medium-level resolution.

At S124, the data transmitter/receiver 81 of the conversion system 80 transmits the medium-level resolution image data and the sound data to the counterpart terminal 10da, through the communications network, in the third communication session "sed13". The data transmitter/receiver 11 of the counterpart terminal 10da receives the medium-level resolution image data and the sound data.

At S125, the data transmitter/receiver 11 of the counterpart terminal 10da transmits the contents data, which includes the medium-level resolution image data and the sound data, to the conversion system 80 through the communications network 2 in the third communication session "sed13". The data transmitter/receiver 81 of the conversion system 80 receives the medium-level resolution image data and the sound data.

At S126, the communications protocol converter 82 of the conversion system 80 refers to the conversion rule data stored in the memory 800, and converts the medium-level resolution image data and the sound data from the communications protocol of the counterpart terminal 10da to the communications protocol of the request terminal 10aa. More specifically, at S126, the communications protocol converter 82 converts the medium-level resolution image data of FIG. 5, to the low-level resolution image data of FIG. 30A, the low-medium-level resolution image data of FIG. 30B, and the medium-level resolution image data of FIG. 30C.

Referring to FIG. 30A, the low-level resolution image data has 160 pixels in the horizontal direction and 120 pixels in the vertical direction. Referring to FIG. 30C, the medium-level resolution image data has 320 pixels in the horizontal direction and 240 pixels in the vertical direction. Referring to FIG. 30B, the low-medium-level resolution image data has 240 pixels in the horizontal direction and 180 pixels in the vertical direction, such that the low-medium resolution image data has a resolution level greater than the resolution of the low-level resolution image data, but lower than the resolution of the medium-level resolution image data.

As the medium-level resolution image data is received from the non-dedicated terminal 10D, the conversion system 80 is not able to generate the high-level resolution image data of FIG. 3C, which is higher in resolution than the medium-level resolution image data. For this reasons, the medium-level resolution image data transmitted from the counterpart terminal 10da is treated as the high-level resolution image data. Based on the high-level resolution image data, image data of three different resolution levels are generated as described above referring to FIGS. 30A to 30C.

At S127, the data transmitter/receiver 81 of the conversion system 80 transmits the image data of three different resolution levels and the sound data to the relay device 30a, through the communications network, in the second communication session "sed12". The data transmitter/receiver 31 of the relay device 30a receives the image data of three different resolution levels and the sound data.

At S128, the data transmitter/receiver 31 of the relay device 30a transmits the image data of three different resolution levels and the sound data to the request terminal 10aa, through the communications network 2, in the first communication session "sed11". The data transmitter/receiver 11 of the request terminal 10aa receive the image data of three different resolution levels and the sound data.

As described above, when the communications protocol used by the counterpart terminal 10 that is the non-dedicated terminal 10D is different from the communications protocol used by the request terminal 10 that is the dedicated terminal 10A, the management system 50 transmits the operation state information indicating that the operation state of the counterpart terminal 10 is unknown to the request terminal 10. Alternatively, in such case, the management system 50 may transmit the information indicating that the communications protocol of the counterpart terminal 10 is different from the communications protocol of the request terminal 10. The request terminal 10 notifies the user of the received information, for example, by displaying visual information that reflects the received information. Based on this notification, the user at the request terminal 10 is able to know that the operation state of the counterpart terminal 10 is not obtained, as the counterpart terminal 10 uses a different communications protocol. Thus, the user at the request terminal 10 can instantly recognize that the operation state of the counterpart terminal 10 is not available, not because of there is a trouble in communications with the counterpart terminal 10. Based on this information, the user at the request terminal 10 can proceed to the next step to select one of the counterpart terminals 10 to start a communication session.

Further, in the above-described examples, a portion of the terminal ID assigned to the communication terminal 10 is used to obtain the communications protocol information. With this configuration, the processing speeds increase at least compared to the case where the entire terminal ID is used to obtain the communications protocol information.

In the above-described example referring to FIG. 19, the terminal ID prefix and the communications protocol information are stored in association with each other. Alternatively, as illustrated in FIG. 31, the communications protocol management table may store a part of model number, such as the model number prefix, in association with the communications protocol information. More specifically, in this example, the terminal 10 with the model number prefix "90" is the dedicated terminal 10A. The terminal 10 with the model number prefix "80" is the non-dedicated terminal 10D. The terminal 10 with the model number prefix "70" is the non-dedicated terminal 10 that communicates using a communications protocol other than that of any one of the terminal 10A and the terminal 10D.

In one example of obtaining communications protocol using the communications protocol management tale of FIG. 31, the management system 50 refers to the candidate list management table of FIG. 15 to obtain one or more counterpart terminal IDs, which are associated with the request terminal ID that is received from the request terminal 10. The management system 50 then refers to the terminal information management table of FIG. 13 to obtain the model number for each one of the candidate counterpart terminal IDs, and further refers to the communications protocol management table of FIG. 31 to obtain the communications protocol information using a part of the model number.

In the above-described examples, the management system 50 manages communications at least between a first communication terminal 10 and a second communication terminal 10, such as between the request terminal 10 and the counterpart terminal 10. For example, the first communication terminal may be the request terminal 10 or the dedicated terminal 10A, and the second communication terminal may be the counterpart terminal 10 or the non-dedicated terminal 10D. Alternatively, the first communication terminal may be the counterpart terminal 10 or the non-dedicated terminal 10D, and the second communication terminal may be the request terminal 10 or the dedicated terminal 10A.

Further, the contents data described above is one example of data, or a signal, that may be transmitted or received through a communications network. The data to be transmitted or received may include text data or image file data, which may be transmitted or received together with the contents data including image data and/or sound data. In such case, the communication terminal 10 may be implemented by an information processing apparatus that transmits or receives data such as the text or image file data. The management system 50 may be implemented by a file management system capable of managing data such as the text or image file data. The communication system 1 may manage data such as the text or image file data, in addition to the contents data including image data and/or sound data.

In this example, the relay device 30, the management system 50, the conversion system 80, the program providing system 90, and the maintenance system 100 may be each implemented by a single computer. Alternatively, any number of parts, functions, or modules of the relay device 30, the management system 50, the conversion system 80, the program providing system 90, and the maintenance system 100 may be classified into a desired number of groups to be carried out by a plurality of computers. In case the program providing system 90 is implemented by the single computer, the program to be provided by the program providing system 90 may be transmitted, one module by one module, after dividing into a plurality of modules, or may be transmitted at once. In case the program providing system 90 is implemented as a plurality of computers, each computer may transmit each module that is stored in its memory, after the program is divided into a plurality of modules.

A recording medium storing any one of the terminal control program, relay control program, conversion control program, and communication management program, or a storage device such as the HDD 204 that stores any one of the terminal control program, relay control program, conversion control program, and communication management program, or the program providing system 90 provided with the HD 204 storing any one of the terminal control program, relay control program, conversion control program, and communication management program, may be distributed within the country or to another country as a computer program product.

In the above-described examples, the quality of image data to be processed by the relay device 30, which is determined based on information obtainable from any one of the data quality management table of FIG. 11 and the quality management table of FIG. 18, is analyzed in terms of image resolution. Alternatively, any other criteria may be used to analyze quality of image data including, for example, depth of image, sampling frequency in case of sound data, and bit length in case of sound data. Further, the sound data may be transmitted or received in three items of sound data including high-resolution sound data, medium-resolution sound data, and low-resolution sound data.

Further, the date and time information stored in the relay device management table of FIG. 12 or the terminal state management table of FIG. 14, or the delay information stored in the session management table of FIG. 16, is expressed in terms of date and time. Alternatively, the date and time information or the delay information may be expressed only in terms of time such as the time at which information is received.

Further, in the above-described examples, the relay device IP address of the relay device 30 and the terminal IP address of the terminal 10 are respectively managed using the relay device management table of FIG. 12 and the terminal state management table of FIG. 14. Alternatively, the relay device 30 and the terminal 10 may each be managed using any other identification information or using any other tables. For example, when the relay device 30 or the terminal 10 needs to be identified on the communications network 2, the relay device 30 or the terminal 10 may be managed using Fully Qualified Domain Name (FQDN). In such case, the communication system 1 is provided with a domain name system (DNS) server that obtains the IP address that corresponds to the FQDN of the relay device 30 or the terminal 10. In view of this, identification information for identifying the relay device 30 on the communications network 2 may not only include the identification information that identifies the relay device 30 on the communications network 2, but also identification information that identifies a node on the communications network 2 to which the relay device 30 is connected, or identification information that identifies a node on the communications network 2 from which the relay device 30 is connected. Similarly, identification information for identifying the terminal 10 on the communications network 2 may not only include the identification information that identifies the terminal 10 on the communications network 2, but also identification information that identifies a node on the communications network 2 to which the terminal 10 is connected, or identification information that identifies a node on the communications network 2 from which the terminal 10 is connected.

In the above-described examples, the communication system 1 of FIG. 1 is treated as a videoconference system. Alternatively, the communication system 1 of FIG. 1 may be implemented as a teleconference system such as the IP teleconference system or the Internet teleconference system. Alternatively, the communication system 1 of FIG. 1 may be implemented as a car navigation system. For example, the request terminal 10 may be implemented as a car navigation system that is installed onto an automobile. The counterpart terminal 10 may be implemented as a management terminal or server at a management center that manages the car navigation system or a car navigation system that is installed onto another automobile.

In another example, the communication system 1 of FIG. 1 may be implemented as a communication system having a portable phone. In such case, the terminal 10 is implemented as the portable phone. The terminal 10, or the portable phone 10, includes a body, a menu screen display button, a display section, a microphone provided at a lower portion of the body, and a speaker provided at an upper portion of the body. When selected, the menu screen display button causes the display section to display a menu screen in which various icons each indicating a specific application program are displayed. In this example, the display section displays a candidate terminal list that lists a plurality of terminal names together with a plurality of icons each reflecting the operation state of each candidate terminal. Since the terminal 10 in this example is implemented as a portable phone, the name of a user who owns the specific terminal, or a nickname of the user, is displayed as the terminal name.

The display section is a touch panel screen, which allows the user to select one of the plurality of terminal names being displayed by the display section. When a specific terminal name, or a user name, is selected, the portable phone starts communication with the specific terminal that is selected in a substantially similar manner as described above.

In the above-described examples, the contents data is assumed to include image data and sound data. Alternatively, the contents data may include any other type of data that affects human senses of sight in alternative to image data, or any other type of data that affects human senses of hearing in alternative to sound data. Alternatively, the contents data may include any other type of data that affects human senses of sight, smell, taste, touch, and hearing. In case the contents data that affects human senses of touch, the terminal 10 may convey the contents data that reflects senses of touch that is felt by a user at the terminal 10 to another terminal 10 through the communications network 2. In case the contents data that affects human senses of smell, the terminal 10 may convey the contents data that affects senses of smell felt by a user at the terminal 10 to another terminal 10 through the communications network 2. In case the contents data that affects human senses of taste, the terminal 10 may convey the contents data that affects senses of taste felt by a user at the terminal 10 to another terminal 10 through the communications network 2.

Further, the contents data may only include one type of contents data selected from sight data such as image data, hearing data such as sound data, touch data, smell data, and taste data.

Further, in the above-described examples, the communication system 1 is implemented as a videoconference system for use at offices. Other examples of use of the communication system 1 include, but not limited to, meetings, casual conversation among family members or friends, and distribution of information in one direction.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

Further, any of the above-described devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, nonvolatile memory cards, ROM (read-only-memory), etc.

Alternatively, any one of the above-described and other methods of the present invention may be implemented by ASIC, prepared by interconnecting an appropriate network of conventional component circuits or by a combination thereof with one or more conventional general-purpose microprocessors and/or signal processors programmed accordingly.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cashe memory of the CPU, and the RAM may function as a physical memory or a primary memory of the apparatus, while the HDD may function as a secondary memory of the apparatus.

In one example, a communication management system includes: a candidate counterpart terminal manager that stores, for each one of a plurality of communication terminals, terminal identification information of the communication terminal in association with terminal identification information of a candidate counterpart communication terminal, the candidate counterpart terminal information being one or more candidate counterpart communication terminals that may be requested by the communication terminal to start communication; a communications protocol manager that stores communications protocol information indicating a communications protocol of the communications terminal in association with a part of the identification information that identifies the communication terminal using the communications protocol; a receiver that receives identification information of a request communication terminal from the request communication terminal, the request communication terminal being one of the plurality of communication terminals; an extractor that obtains identification information of a candidate counterpart communication terminal that is associated with the identification information of the request communication terminal from the candidate counterpart terminal manager, and to obtain communications protocol information associated with a part of the obtained identification information of the candidate counterpart communication terminal from the communications protocol manager; a determiner that determines whether a communications protocol of the candidate counterpart communication terminal is the same as a communications protocol of the request communication terminal to generate a determination result; and a transmitter that transmits terminal state information to the request communication terminal. When the determination result indicates that the communications protocol of the candidate counterpart communication terminal is different than the communications protocol of the request communication terminal, the terminal state information includes the obtained identification information of the candidate counterpart communication terminal, and one of operation state information indicating that an operation state of the candidate counterpart communication terminal is unknown or information indicating that the communications protocol of the candidate counterpart communication terminal is different than the communications protocol of the request communication terminal.

For example, the communications protocol manager corresponds to any desired processor that manages information stored in the communications protocol management DB 5008. The candidate counterpart terminal manager corresponds to any desired processor that manages information stored in the candidate list management DB 5004. The receiver corresponds to the data transmitter/receiver 51 of the management system 50, which may be implemented by any desired processor that receives information in cooperation with an interface. The extractor corresponds to the extractor 54 of the data transmitter/receiver 51 of the management system 50, which may be implemented by any desired processor. The determiner corresponds to the determiner 55 of the management system 55, which may be implemented by any desired processor. The transmitter corresponds to the data transmitter/receiver 51 of the management system 50, which may be implemented by any desired processor that transmits information in cooperation with an interface.

As described above, when the communications protocol being used by the candidate counterpart communication terminal is different than the communications protocol being used by the request communication terminal, the management system is not able to send information indicating the operation state of the counterpart communication terminal to the request communication terminal, as the management system does not manage the operation state of such terminal. Unless the user can recognize why the operation state of the counterpart communication terminal is not available, the user is not able to determine whether to wait for the request communication terminal to receive the operation state of the counterpart communication terminal or to start communicating with the counterpart communication terminal. For example, if the communications protocol is the same between the request communication terminal and the counterpart communication terminal, the user may determine to wait until the request communication terminal receives information indicating the operation state of the counterpart communication terminal, as the management system is able to send such information. In another example, if the communications protocol differs between the request communication terminal and the counterpart communication terminal, the user may determine to start communicating with the counterpart communication terminal as the operation state of the counterpart communication terminal cannot be obtained.

According to the above-described embodiment, even when the management system communicates with the counterpart communication terminal using a communications protocol different from a communications protocol used for communication with the request communication terminal, the communication management system transmits the operation state information indicating that the operation state of the candidate counterpart communication terminal is unknown, or the information indicating that the communications protocol of the candidate counterpart communication terminal is different from the communications protocol of the request communication terminal. With this information being transmitted from the communication management system, a user at the request communication terminal is able to know that the operation state of the candidate counterpart communication terminal cannot be obtained as the communications protocol is different. Based on this information, the user at the request communication terminal is able to determine whether to wait for the operation state or to start communicating with the counterpart communication terminal.

In one example, the communication management system further includes terminal state manager that manages, for each one of the plurality of communication terminals, operation state information indicating an operation state of the communication terminal in association with the identification information of the communication terminal. When the determination result indicates that the communications protocol of the candidate counterpart terminal is the same as the communications protocol used by the request communication terminal, the extractor obtains operation state information of the candidate counterpart communication terminal associated with the obtained identification information of the candidate counterpart communication terminal. The transmitter transmits the terminal state information to the request communication terminal, which includes the identification information of the candidate counterpart communication terminal, and the obtained operation state information of the candidate counterpart communication terminal For example, the terminal state manager corresponds to any desired processor that manages information stored in the terminal state management DB 5003.

In one example, the communications protocol of the communication terminal is defined by a call control protocol used for connecting or disconnecting connections between the communication terminal and the counterpart terminal, and an encoding format used for encoding data such as the contents data to an IP packet to be transmitted to the counterpart terminal. When at least one of the call control protocol or the encoding format is different between the communications protocol of the request communication terminal and the communications protocol of the candidate counterpart communication terminal, the determiner determines that the communications protocol of the candidate counterpart communication terminal is different than the communications protocol of the request communication terminal.

In one example, the terminal state manager further manages, for each one of the plurality of communication terminals, terminal name information indicating a terminal name of the communication terminal in association with the terminal identification information of the communication terminal. The transmitter transmits the terminal name information and the identification information of the candidate counterpart communication terminal to the request communication terminal.

In one example, the part of the identification information of the communication terminal, which is associated with the communications protocol information, is common to a group of at least two of the plurality of communication terminals that communicate using the same communications protocol.

In one example, a communication system includes the communication management system of any one of the above-described examples, and the request communication terminal. The request communication terminal includes a receiver that receives the terminal state information from the communication management system, a visual information manager, and a candidate list generator. The visual information manager manages first visual information that visually indicates that the communications protocol used by the candidate counterpart terminal is the same as the communications protocol used by the request terminal, and second visual information that visually indicates that the communications protocol used by the candidate counterpart terminal is different from the communications protocol used by the request terminal, the second visual information visually different from the first visual information. When the request terminal receives the identification information of the candidate counterpart terminal and the operation state information of the candidate counterpart terminal from the management system, the request terminal extracts the first visual information from the visual information manager. When the request terminal receives the identification information of the candidate counterpart terminal, and the operation state information indicating that the operation state of the candidate counterpart terminal is unknown or the operation state information indicating that the communications protocol differs, the request terminal extracts the second visual information from the visual information manager. The candidate list generator generates candidate list data that reflects the first visual information or the second visual information.

In one example, the visual information manager corresponds to any desired processor that manages information stored in the visual information management DB 1001. The candidate list generator corresponds to the candidate list generator 18, which may be implemented by any desired processor.

The request communication terminal may further include displaying means that displays the candidate list data generated by the candidate list generator. The displaying means corresponds to any desired display, which is controlled by the display control 16.

In one example, the first visual information includes, for a plurality of types of operation state information of the candidate counterpart terminal, a plurality of types of first visual information each being visually different. The candidate list generator searches the visual information manager using the operation state information received from the management system to extract one type of the first visual information that is associated with the received operation state information.

The first visual information and the second visual information respectively include icons that are different from each other.

Further, the request communication terminal may establish a communication session with a counterpart communication terminal to transmit contents data, the counterpart communication terminal being one of the candidate counterpart communication terminals. When the communications protocol differs between the request communication terminal and the counterpart communication terminal, the communication management system causes a conversion system to convert the contents data to have the communications protocol compatible with the counterpart communication terminal, or with the request communication terminal.

In one example, the first visual information includes, for a plurality of types of operation state information of the candidate counterpart communication terminal, a plurality of types of first visual information each being visually different from one another. The candidate list generator of the request communication terminal operates in cooperation with the visual information manger to select one of the plurality of types of first visual information that is associated with one of the plurality of types of operation state information received from the communication management system, as the first visual information of the candidate counterpart communication terminal.

In one example, the first visual information and the second visual information respectively include icons that are different in appearance from each other.

In another example, the present invention may reside in a method of managing communication performed by a plurality of communication terminals each of which transmits or receives contents data, performed by a communication management system. The method includes: storing, for each one of a plurality of communication terminals, terminal identification information of the communication terminal in association with terminal identification information of a candidate counterpart communication terminal, the candidate counterpart communication terminal being one or more counterpart communication terminals that may be requested by the comunication terminal to start communication; storing communications protocol information indicating a communication protocol of the communication terminal, in association with a part of the identification information for identifying the communication terminal that uses the communications protocol; receiving identification information of a request communication terminal, the request communication terminal being one of the plurality of communication terminals; obtaining identification information of a candidate counterpart communication terminal that is associated with the identification information of the request communication terminal; obtaining communications protocol information associated with a part of the obtained identification information of the candidate counterpart communication terminal; determining whether the communications protocol of the candidate counterpart communication terminal is the same as a communications protocol of the request communication terminal to generate a determination result; and transmitting terminal state information to the request communication terminal to cause the request communication terminal to display candidate list data based on the terminal state information. When the determination result indicates that the communications protocol of the candidate counterpart communication terminal is different than the communications protocol of the request communication terminal, the terminal state information includes the obtained identification information of the candidate counterpart communication terminal, and one of operation state information indicating that an operation state of the candidate counterpart communication terminal is unknown or information indicating that the communications protocol of the candidate counterpart communication terminal is different than the communications protocol of the request communication terminal.

In one example, the communication management system further includes terminal state manager, which manages, for identification information of each one of the plurality of comunication terminals, operation state information indicating the operation state of the terminal. When the determining step indicates that the communications protocol of the candidate counterpart terminal is the same as the communications protocol used by the request terminal, the communication management method further performs: searching the terminal state manager using the identification information of the candidate counterpart terminal extracted by the extracting step to extract operation state information associated with the identification information of the candidate counterpart terminal; and transmitting the identification information of the candidate counterpart terminal and the extracted operation state information of the candidate counterpart terminal, to the request terminal.

In one example, the communications protocol of the communication terminal is defined by a call control protocol used for connecting or disconnecting connections with the counterpart terminal, and an encoding format used for encoding data such as the contents data to an IP packet to be transmitted to the counterpart terminal. When at least one of the call control protocol or the encoding format is different between the communications protocol of the request terminal and the communications protocol of the candidate counterpart terminal, the determining step determines that the communications protocol of the candidate counterpart terminal is different from the communications protocol of the request terminal.

What is claimed is:

1. A communication management system, comprising:
a candidate counterpart terminal manager that stores, for each one of a plurality of communication terminals, terminal identification information of the communication terminal in association with terminal identification information of a candidate counterpart communication terminal, the candidate counterpart communication terminal being one or more counterpart communication terminals that may be requested by the communication terminal to start communication;
a communications protocol manager that stores communications protocol information indicating a communication protocol of the communication terminal, in association with a part of the identification information for identifying the communication terminal that uses the communications protocol;
a receiver that receives identification information of a request communication terminal from the request communication terminal, the request communication terminal being one of the plurality of communication terminals;
an extractor that obtains identification information of a candidate counterpart communication terminal that is associated with the identification information of the request communication terminal from the candidate counterpart terminal manager, and obtains communications protocol information associated with a subportion of the obtained identification information of the candidate counterpart communication terminal from the communications protocol manager by using only the subportion of the obtained identification information of the candidate counterpart communication terminal;
a determiner that determines whether a communications protocol of the candidate counterpart communication terminal is the same as a communications protocol of the request communication terminal to generate a determination result;
a transmitter that transmits terminal state information to the request communication terminal, wherein when the determination result indicates that the communications protocol of the candidate counterpart communication terminal is different than the communications protocol of the request communication terminal, the terminal state information includes the obtained identification information of the candidate counterpart communication terminal, and one of operation state information indicating that an operation state of the candidate counterpart communication terminal is unknown or information indicating that the communications protocol of the candidate counterpart communication terminal is different than the communications protocol of the request communication terminal.

2. The communication management system of claim 1, further comprising:
a terminal state manager that manages, for each one of the plurality of communication terminals, operation state information indicating an operation state of the communication terminal in association with the identification information of the communication terminal, and
wherein when the determination result indicates that the communications protocol of the candidate counterpart communication terminal is the same as the communications protocol of the request communication terminal,
the extractor obtains operation state information of the candidate counterpart communication terminal associated with the obtained identification information of the candidate counterpart communication terminal, and
the transmitter transmits the terminal state information to the request communication terminal, which includes the identification information of the candidate counterpart communication terminal, and the obtained operation state information of the candidate counterpart communication terminal.

3. The communication management system of claim 1, wherein
the communications protocol of the communication terminal is defined at least by a call control protocol used for connecting or disconnecting connections between the communication terminal and a counterpart communication terminal, and an encoding format used for encoding data to be transmitted from the communication terminal to the counterpart communication terminal, and
when at least one of the call control protocol and the encoding format is different between the communications protocol of the request communication terminal and the communications protocol of the candidate counterpart communication terminal, the determiner determines that the communications protocol of the candidate counterpart communication terminal is different than the communications protocol of the request communication terminal.

4. The communication management system of claim 2, wherein the terminal state manager further manages, for each one of the plurality of communication terminals, terminal name information indicating a terminal name of the communication terminal in association with the terminal identification information, and
the transmitter transmits the terminal name information and the identification information of the candidate counterpart communication terminal to the request communication terminal.

5. The communication management system of claim 1, wherein the subportion of the identification information of the communication terminal, which is associated with the communications protocol information, is common to a group of at least two of the plurality of communication terminals that communicate using the same communications protocol.

6. The communication management system of claim 1, wherein the identification information of the communication terminal is terminal code information indicating an identification code that is uniquely assigned to the communication terminal.

7. A communication system, comprising:
the communication management system of claim 2; and
the request communication terminal connected to the communication management system via a communications network, wherein the request communication terminal includes:
a receiver that receives the terminal state information from the communication management system;
a visual information manager that manages first visual information that visually represents that the communications protocol of the candidate counterpart communication terminal is the same as the communications protocol of the request communication terminal, and second visual information that visually represents that the operation state of the candidate counterpart communication terminal is unknown or the communications protocol of the candidate counterpart communication terminal is different from the communications protocol of the request communication terminal; and a candidate list generator that selects one of the first visual information or the second visual information based on the terminal state information received from the communication management system and to generate candidate list data based on the selected visual information, wherein, when the received terminal state information includes the operation state information of the candidate counterpart communication terminal, the candidate list generator selects the first visual information, and when the received terminal state information includes one of the operation state information indicating that the operation state of the candidate counterpart communication terminal is unknown or information indicating that the communications protocol of the candidate counterpart communication terminal is different from the communications protocol of the request communication terminal, the candidate list generator selects the second visual information.

8. The communication system of claim 7, wherein the request communication terminal further includes:

a display that displays the candidate list data to a user, wherein the candidate list data includes the identification information of the candidate counterpart communication terminal, and the selected one of the first visual information or the second visual information.

9. A method of managing communication, the method comprising:

receiving identification information of a request communication terminal, the request communication terminal being one of a plurality of communication terminals;

obtaining identification information of a candidate counterpart communication terminal that is associated with the identification information of the request communication terminal, the candidate counterpart communication terminal being one or more counterpart communication terminals that may be requested by the request communication terminal to start communication;

obtaining communications protocol information associated with a subportion of the obtained identification information of the candidate counterpart communication terminal by using only the subportion of the obtained identification information of the candidate counterpart communication terminal, the communications protocol information indicating a communication protocol of the candidate counterpart communication terminal;

determining whether the communications protocol of the candidate counterpart communication terminal is the same as a communications protocol of the request communication terminal to generate a determination result; and transmitting terminal state information to the request communication terminal to cause the request communication terminal to display candidate list data based on the terminal state information, wherein when the determination result indicates that the communications protocol of the candidate counterpart communication terminal is different than the communications protocol of the request communication terminal, the terminal state information includes the obtained identification information of the candidate counterpart communication terminal, and one of operation state information indicating that an operation state of the candidate counterpart communication terminal is unknown or information indicating that the communications protocol of the candidate counterpart communication terminal is different than the communications protocol of the request communication terminal.

10. The method of claim 9, wherein when the determination result indicates that the communications protocol of the candidate counterpart communication terminal is the same as the communications protocol of the request communication terminal, the method further comprises:

obtaining operation state information of the candidate counterpart communication terminal that is stored in association with the obtained identification information of the candidate counterpart communication terminal, and the terminal state information to be transmitted to the request communication terminal includes the identification information of the candidate counterpart communication terminal, and the obtained operation state information of the candidate counterpart communication terminal.

11. A non-transitory recording medium which, when executed by a processor, cause the processor to perform a method of managing communication, the method comprising:

receiving identification information of a request communication terminal, the request communication terminal being one of a plurality of communication terminals;

obtaining identification information of a candidate counterpart communication terminal that is associated with the identification information of the request communication terminal, the candidate counterpart communication terminal being one or more counterpart communication terminals that may be requested by the request communication terminal to start communication;

obtaining communications protocol information associated with a subportion of the obtained identification information of the candidate counterpart communication terminal by using only the subportion of the obtained identification information of the candidate counterpart communication terminal, the communications protocol information indicating a communication protocol of the candidate counterpart communication terminal;

determining whether the communications protocol of the candidate counterpart communication terminal is the same as a communications protocol of the request communication terminal to generate a determination result; and transmitting terminal state information to the request communication terminal to cause the request communication terminal to display candidate list data based on the terminal state information, wherein when the determination result indicates that the communications protocol of the candidate counterpart communication terminal is different than the communications protocol of the request communication terminal, the terminal state information includes the obtained identification information of the candidate counterpart communication terminal, and one of operation state information indicating that an operation state of the candidate counterpart communication terminal is unknown or information indicating that the communications protocol of the candidate counterpart communication terminal is different than the communications protocol of the request communication terminal.

12. The method of claim 9, wherein the step of obtaining the communications protocol information comprises obtaining the communications protocol information using only a terminal ID prefix of the candidate counterpart communication terminal, the terminal ID prefix being the subportion of the obtained identification information of the candidate counterpart communication terminal.

* * * * *